US012479471B2

(12) United States Patent
Mehdipour et al.

(10) Patent No.: US 12,479,471 B2
(45) Date of Patent: Nov. 25, 2025

(54) AUTONOMOUS VEHICLE YIELDING

(71) Applicant: Motional AD LLC, Boston, MA (US)

(72) Inventors: Noushin Mehdipour, Allston, MA (US); Ji Hyun Jeong, Somerville, MA (US); Amitai Y. Bin-Nun, Pittsburgh, PA (US); Paul Schmitt, Merrimack, NH (US); Radboud Duintjer Tebbens, Newton Center, MA (US)

(73) Assignee: Motional AD LLC, Boston, MA (US)

( * ) Notice: Subject to any disclaimer, the term of this patent is extended or adjusted under 35 U.S.C. 154(b) by 202 days.

(21) Appl. No.: 17/839,520

(22) Filed: Jun. 14, 2022

(65) Prior Publication Data
US 2023/0399014 A1 Dec. 14, 2023

(51) Int. Cl.
*B60W 60/00* (2020.01)
*B60W 10/18* (2012.01)
*B60W 30/18* (2012.01)
*B60W 40/04* (2006.01)

(52) U.S. Cl.
CPC ........ *B60W 60/0011* (2020.02); *B60W 10/18* (2013.01); *B60W 30/181* (2013.01); *B60W 40/04* (2013.01); *B60W 60/0015* (2020.02); *B60W 2554/4041* (2020.02); *B60W 2554/80* (2020.02)

(58) Field of Classification Search
CPC ........ B60W 60/0011; B60W 60/0015; B60W 60/0027; B60W 60/0017; B60W 10/18; B60W 30/181; B60W 40/04; B60W 2554/4041; B60W 2554/80; B60W 2554/4026; B60W 2554/4029; B60W 2554/802; B60W 2552/10; B60W 2552/45; B60W 2552/53

USPC .......................................................... 701/23
See application file for complete search history.

(56) References Cited

U.S. PATENT DOCUMENTS

| 6,370,475 | B1 * | 4/2002 | Breed ................... G08G 1/161 340/436 |
| 12,162,500 | B1 * | 12/2024 | Egbert .............. B60W 50/0205 |
| 2011/0102195 | A1 * | 5/2011 | Kushi .............. G08G 1/096783 340/905 |
| 2018/0356821 | A1 * | 12/2018 | Kentley-Klay ...... G05D 1/0287 |

(Continued)

FOREIGN PATENT DOCUMENTS

WO WO 2020/035728 A2 2/2020

OTHER PUBLICATIONS

International Search Report and Written Opinion received for PCT Patent Application No. PCT/US2023/068455, mailed on Aug. 10, 2023.

(Continued)

*Primary Examiner* — Andrew R Dyer
(74) *Attorney, Agent, or Firm* — Knobbe, Martens, Olson & Bear, LLP

(57) ABSTRACT

Provided are methods for autonomous vehicle yielding, which can include obtaining sensor data associated with an environment and obtaining a rule indicative of a target expressive operation. Some methods described also include determining whether the sensor data meets a first criterion, applying the rule in response to the sensor data meeting the first criterion, evaluating a first trajectory of the autonomous vehicle, and selecting a second trajectory. Systems and computer program products are also provided.

17 Claims, 12 Drawing Sheets

(56) References Cited

U.S. PATENT DOCUMENTS

| | | | |
|---|---|---|---|
| 2021/0053569 A1* | 2/2021 | Censi | B60W 30/18163 |
| 2021/0053570 A1* | 2/2021 | Akella | G05D 1/0088 |
| 2021/0122373 A1* | 4/2021 | Dax | B60W 60/0011 |
| 2021/0179106 A1* | 6/2021 | Kim | B60W 30/162 |
| 2021/0229656 A1* | 7/2021 | Dax | G08G 1/166 |
| 2021/0380137 A1 | 12/2021 | Domeyer et al. | |
| 2021/0394775 A1* | 12/2021 | Julian | G06V 20/58 |
| 2022/0017088 A1* | 1/2022 | Heikal | G08G 1/017 |
| 2022/0111871 A1 | 4/2022 | Schmitt et al. | |
| 2023/0030815 A1* | 2/2023 | Happold | B60W 50/023 |
| 2023/0070734 A1* | 3/2023 | Nayhouse | B60W 60/001 |
| 2023/0093151 A1* | 3/2023 | Shibata | B60W 30/0956 |
| | | | 701/117 |
| 2023/0140569 A1* | 5/2023 | Foster | B60W 60/00274 |
| | | | 701/400 |
| 2023/0351773 A1* | 11/2023 | Chen | G06V 10/82 |
| 2025/0026338 A1* | 1/2025 | Zhou | B60W 30/095 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

International Preliminary Report on Patentability received for PCT Patent Application No. PCT/US2023/068455, mailed on Dec. 26, 2024.

\* cited by examiner

__AUTONOMOUS VEHICLE YIELDING__

BACKGROUND

Road users, such as pedestrians, rely on certain cues (driver gaze, vehicle speed/position, etc.) from vehicles in certain situations, such as prior to crossing a road. However, introducing autonomous vehicles into road users', such as pedestrians, communities and neighborhoods can affect these cue dynamics. It can be a challenge to communicate autonomous vehicle intent to a road user.

DETAILED DESCRIPTION

Figure 1:
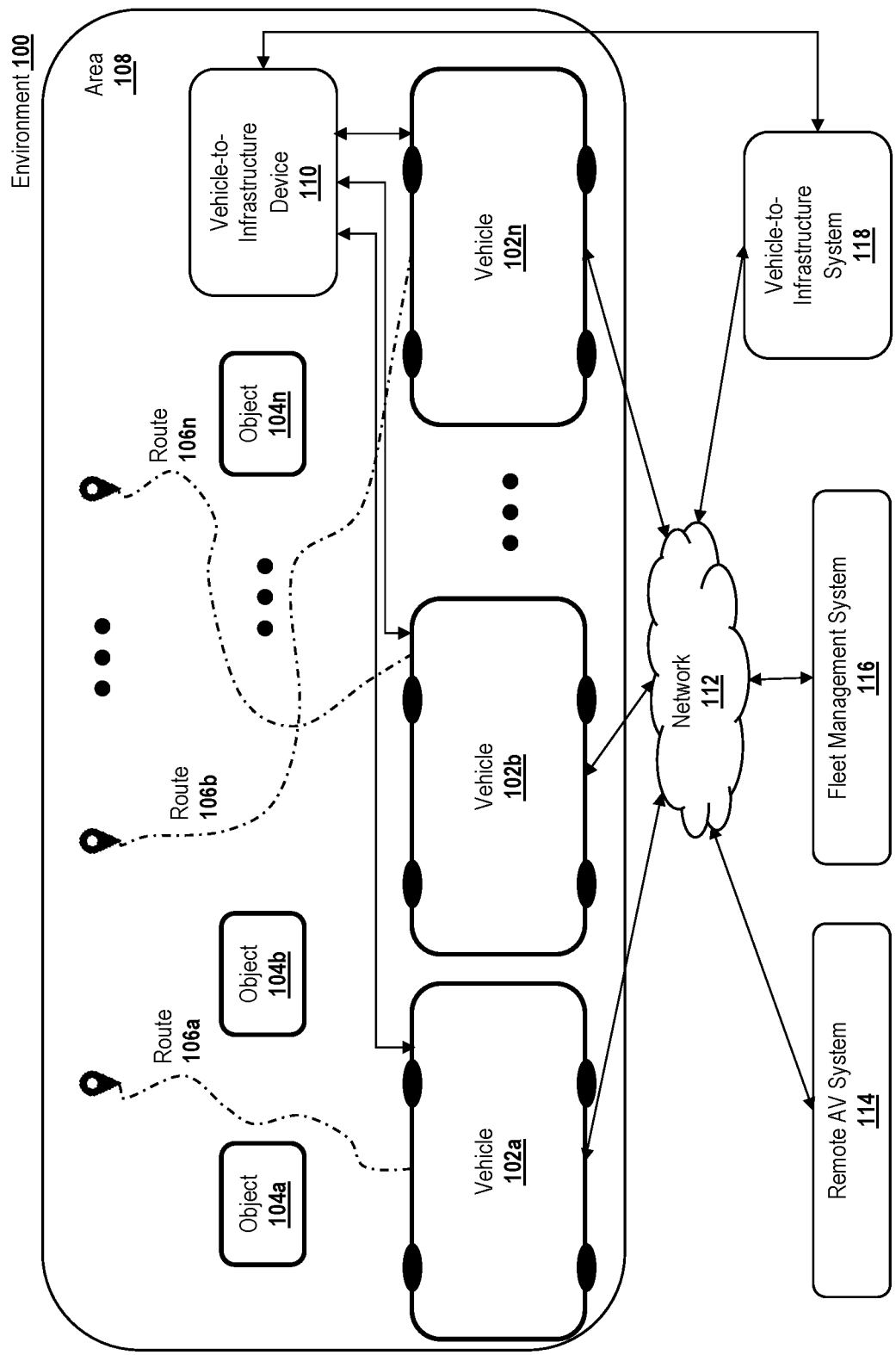
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement techniques that provide a set of rules for how an autonomous vehicle, AV, should yield when approaching a road user, in particular for expressing intent of the AV to the road user. For example, the disclosed technique may be for providing expressive intent of an autonomous vehicle to a road user, such as through the use of a rule and expressive motion of the autonomous vehicle. If a first criterion is met, the rule is applied and subsequently evaluated to determine whether there was any violation of the rule.

By virtue of the implementation of systems, methods, and computer program products described herein, techniques for autonomous vehicle yielding can advantageously include improving safety of road users when encountering the autonomous vehicle. Improving safety can include, for example, improving a sense of safety of the road user (e.g. pedestrian, cyclist, traffic controller) with respect to the autonomous vehicle. Some of the advantages of systems, methods, and computer program products described herein can include the ability to communicate an intended operation of the autonomous vehicle to a road user. This communication may improve the quality of the communication between the autonomous vehicle and the road user in that the likelihood of the autonomous vehicle's intended operation being perceived correctly by the road user may be increased.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 9:
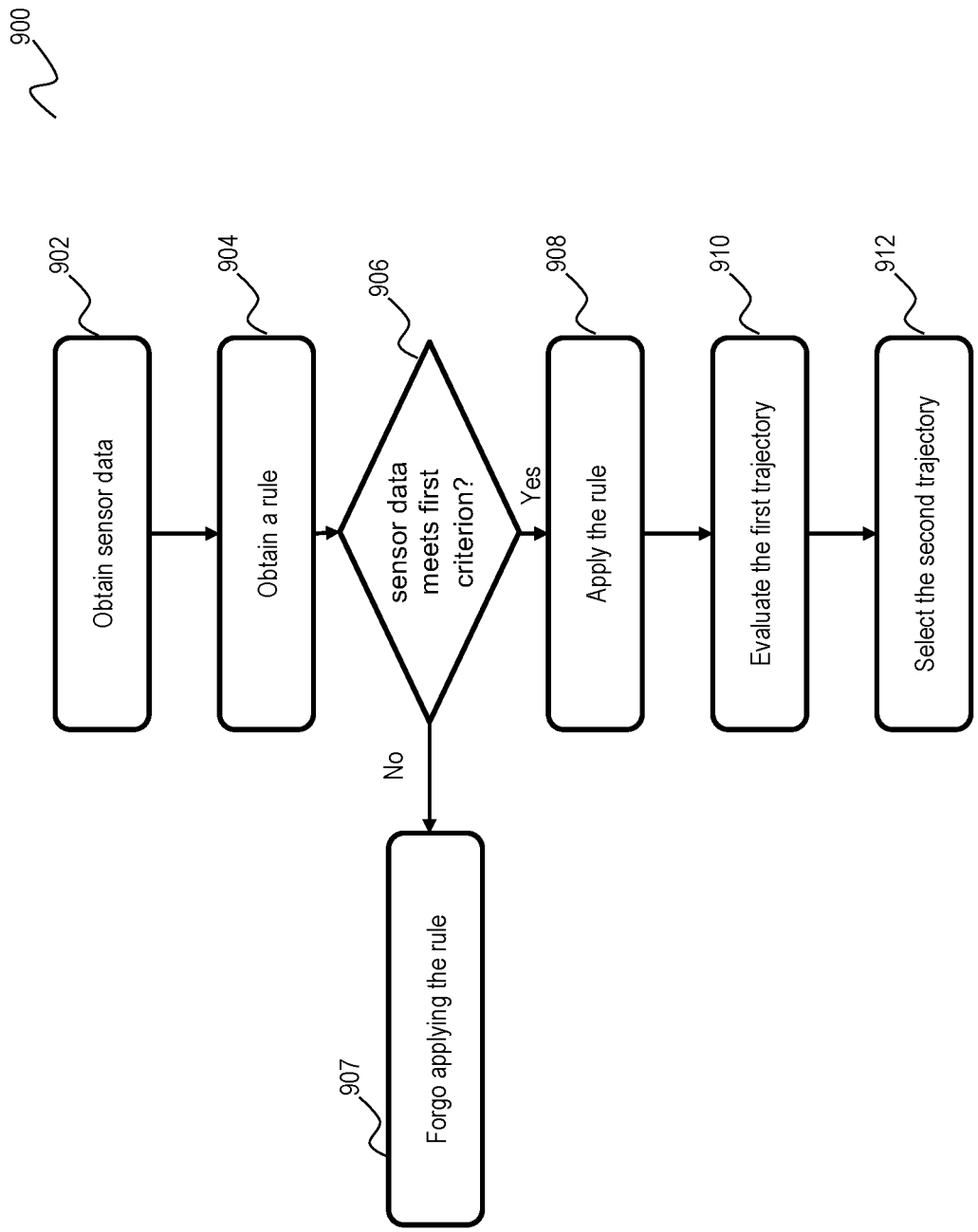
FIG. 9 is a flowchart of an example process for autonomous vehicle yielding.

In some embodiments, device 300 is configured to execute software instructions of one or more steps of the disclosed method, as illustrated in FIG. 9.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
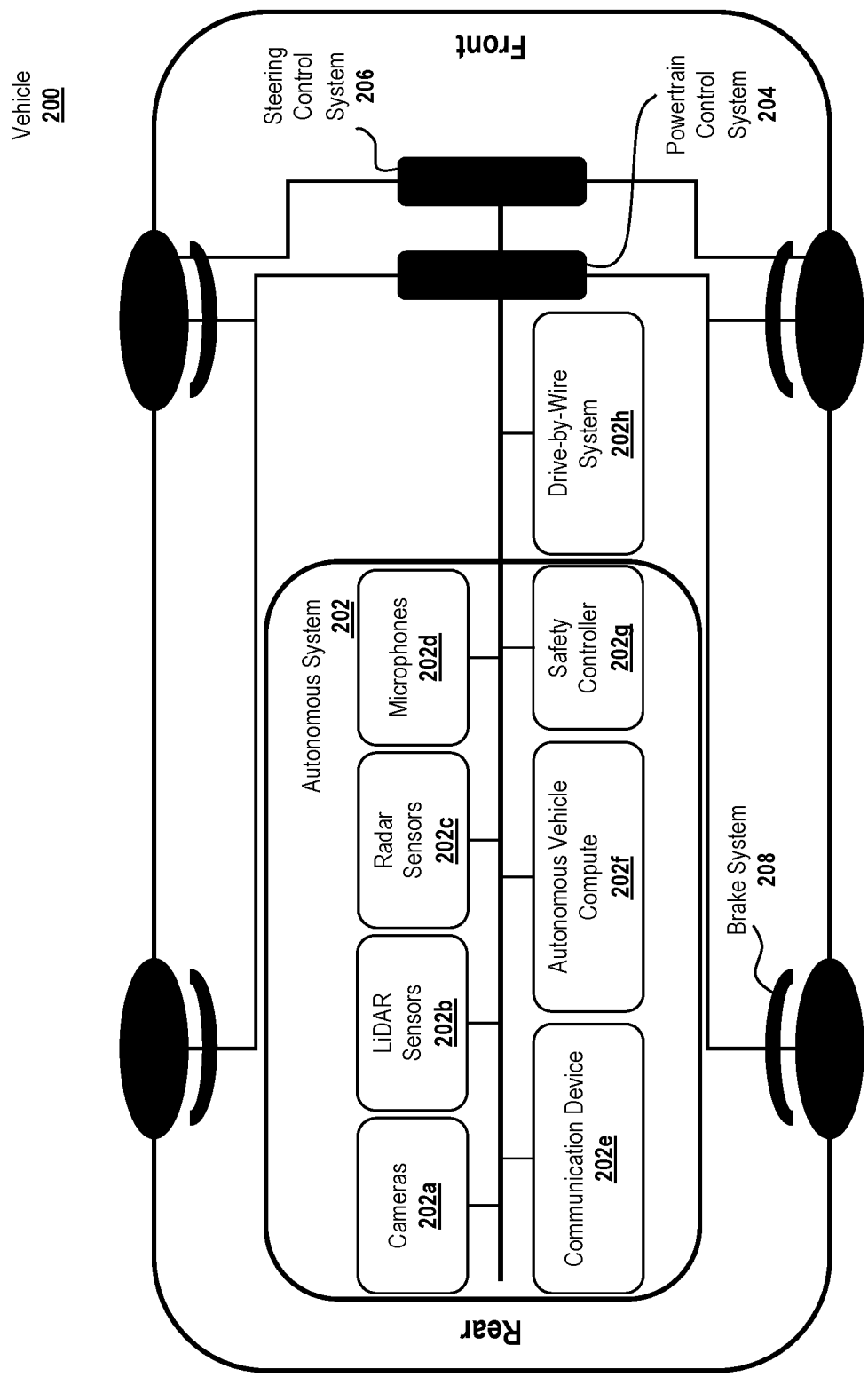
FIG. 2 is a diagram of one or more example systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and safety controller 202g.

Figure 3:
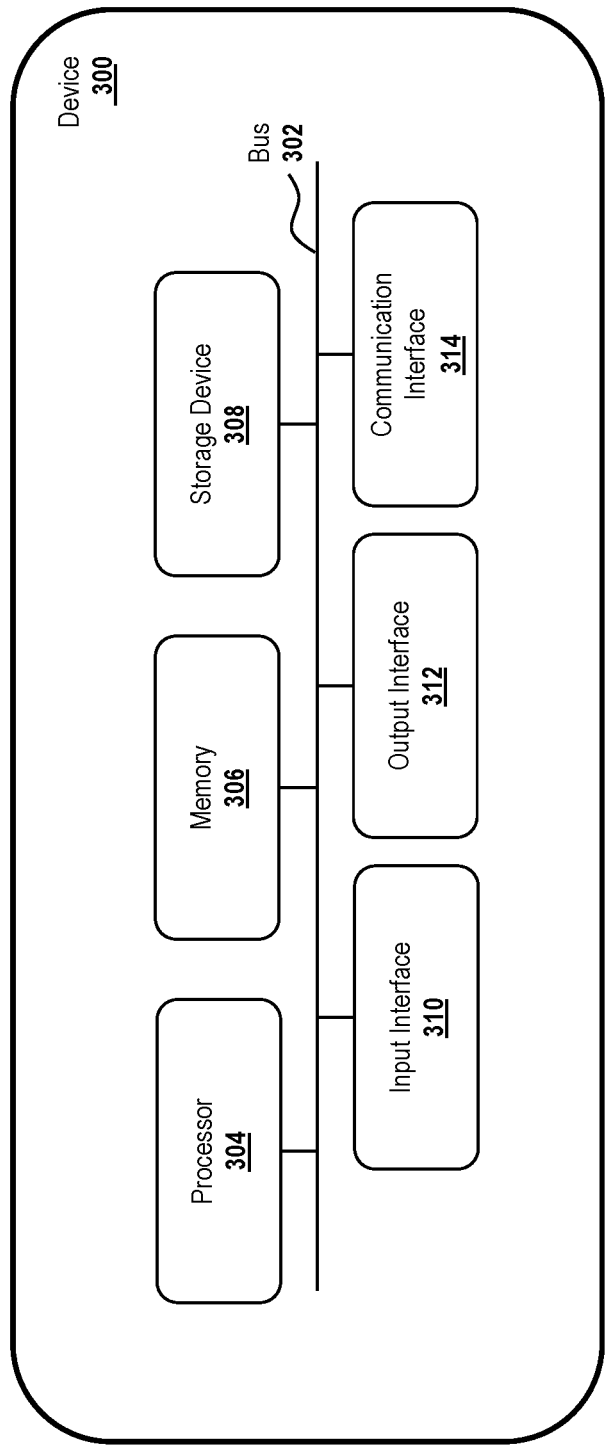
FIG. 3 is a diagram of components of one or more example devices and/or one or more example systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
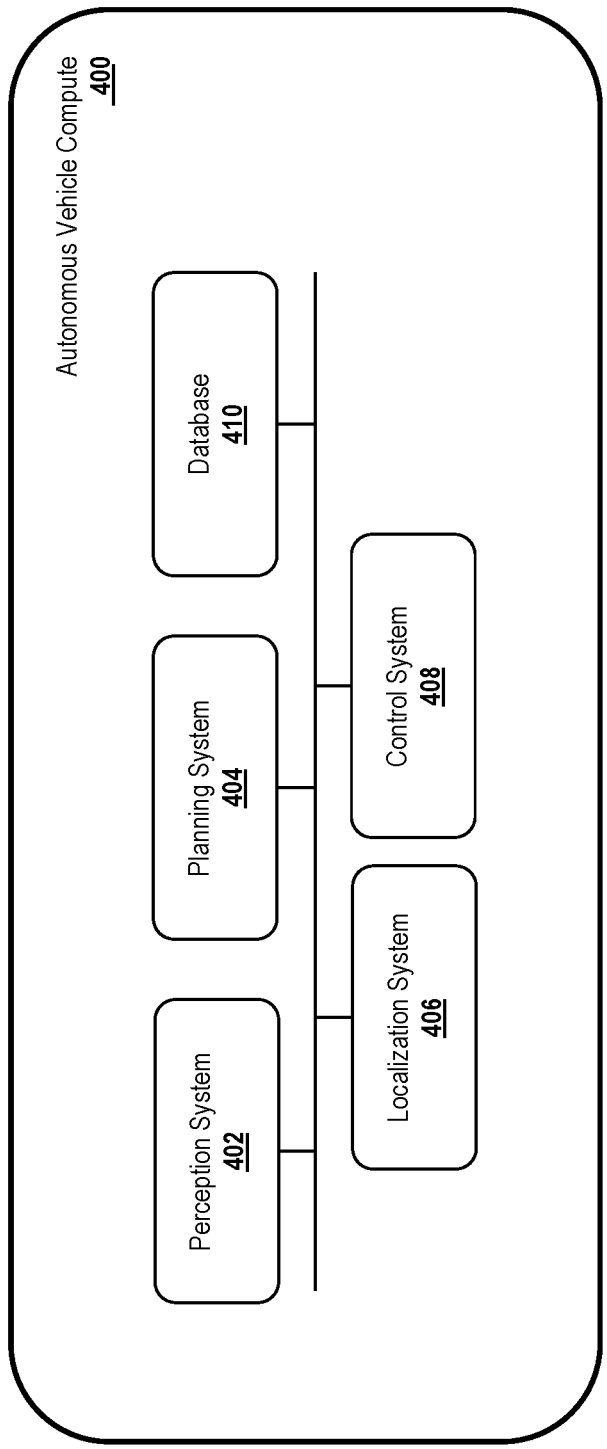
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
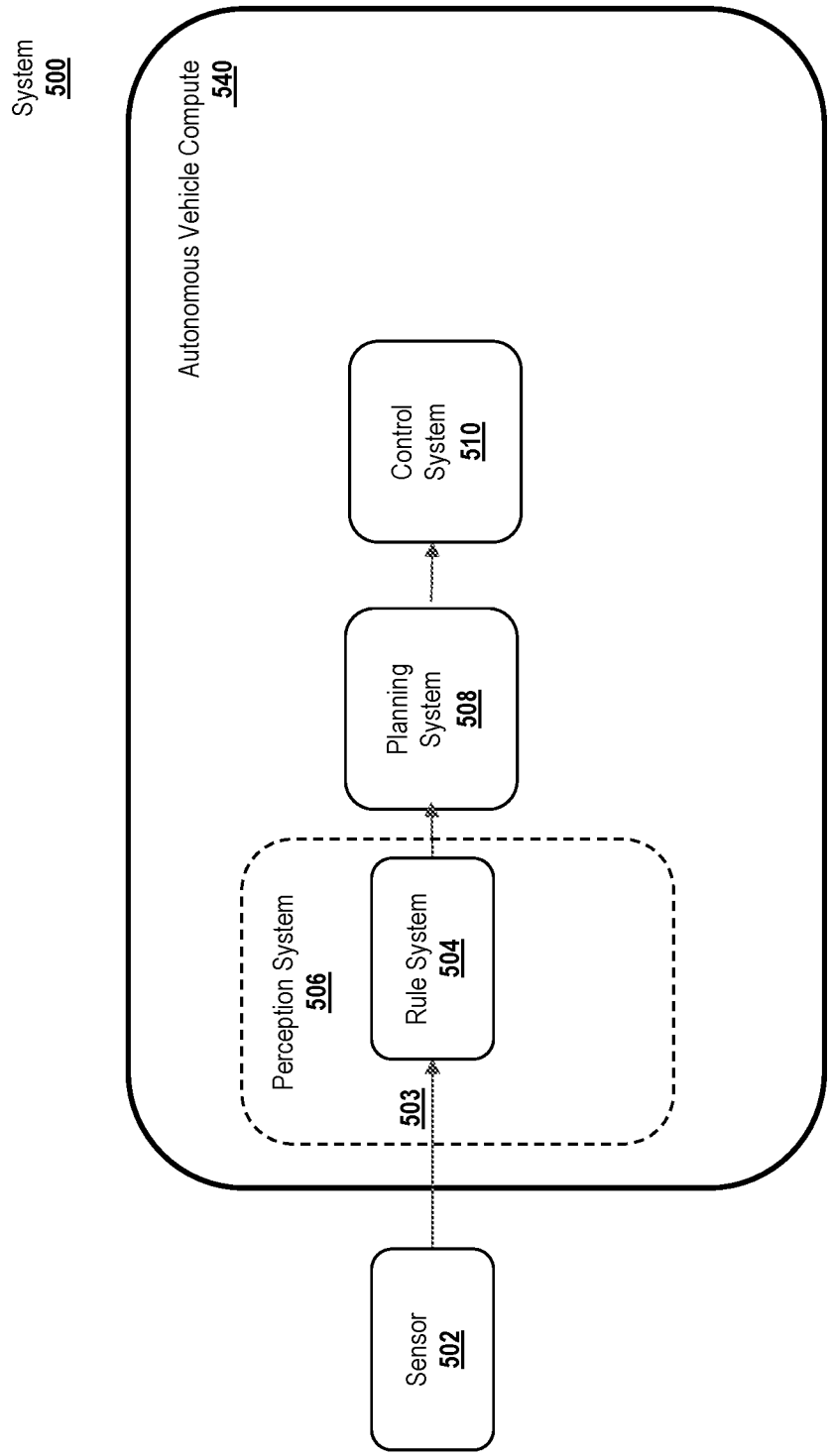
FIG. 5 is a diagram of an example implementation of a process for autonomous vehicle yielding.

Referring now to FIG. 5, illustrated is a diagram of an implementation of a process for autonomous vehicle yielding, such as system 500. In some embodiments, implementation includes an AV compute 540, and a vehicle (similar to vehicle 200 of FIG. 2, such as an autonomous vehicle). In some embodiments, system 500 is the same as or like a system illustrated in FIGS. 2, 3 and 4, such as an AV (e.g. illustrated in FIGS. 2, 3 and 4), an AV system, a remote AV system, a fleet management system, and/or a V2I system. The system 500 can be for operating an autonomous vehicle. The system 500 may not be for operating an autonomous vehicle.

The present disclosure relates to systems, methods, and computer program products that can provide a set of rules for how an autonomous vehicle should yield when approaching a road user, such as at crosswalk, in particular for expressing intent of the autonomous vehicle to a road user. The set of rules can apply to handling the autonomous vehicle when encountering a jaywalker, and/or a traffic controller. The present disclosure relates to systems, methods, and computer program products that provide a violation metric based on the set of rules and the sensed behavior of the autonomous vehicle in the situations mentioned. The set of rules may be seen as defining a successful behavior of the autonomous vehicle, for example in providing an expressive intent that may be understood by a road user.

For example, disclosed herein are one or more mathematical rules which can be used to govern operation of an autonomous vehicle, such as when approaching a road user, e.g. at a crosswalk. The rule(s) can contain one or more expressions devised to characterize a target behavior of the motion of the AV (such as ideal autonomous vehicle motion behavior(s)), a violation metric that can penalize behavior diverging from the target behavior (e.g. non-ideal behavior), and behavior entry and/or exit criteria (e.g., rule scope). A rule can be seen as defining a rule scope, which characterizes an entry criterion for entering the rule and/or an exit criterion for exiting the rule. Rules can be used to provide a definition of a successful behavior, metrics for behavior violation and behavior of entry/exit criteria (e.g., rule scope). In some embodiments, the planning system can access data including rules used for planning. For example, rules are specified using a formal language, e.g., using Boolean logic. In a situation encountered by the AV, at least some of the rules may apply to the situation. For example, a rule applies to a given situation whether the entry criterion is met based on information available to the AV, e.g., information about the surrounding environment.

An autonomous vehicle can advantageously communicate intent of the autonomous vehicle. Ideal behavior of an autonomous vehicle can include stopping sufficiently far to yield way at a cross walk. The disclosure can formalize a target or desired behavior of the AV, such as target expressive operations, as well as behavior entry and/or exit criteria, and/or entry and/or exit triggers. Further, the disclosure formalizes a metric, e.g. violation metric, to penalize diverging behaviors. Autonomous vehicle motion behaviors can significantly improve pedestrian sense of safety, confidence, and/or intention understanding.

Advantageously, expressive autonomous vehicle motions can yield statistically significant improvements in pedestrian sense of safety, confidence, and autonomous vehicle intention understanding. For example, the expressive autonomous vehicle motion illustrated in this disclosure can be a better indicator to a pedestrian than other current techniques, such as lights and/or sounds. This may be in part because expressive autonomous vehicle motion more closely mimics real world experiences of a pedestrian. Happy pedestrians can benefit reception of autonomous vehicles by communities within their neighborhoods. Advantageously, the disclosure can be beneficial to log post-processing and evaluation of on-road behavior of an autonomous vehicle. For example, the disclosure use a violation metric for measuring and evaluation of the autonomous vehicle, such as for whether the autonomous vehicle violates a rule while on the road.

Disclosed herein is a system 500. In some embodiments or examples, the system includes at least one processor. In some embodiments or examples, the system 500 includes at least one non-transitory computer readable medium storing instructions that, when executed by the at least one processor, cause the at least one processor to perform operations including obtaining, using the at least one processor, sensor data associated with an environment in which an autonomous vehicle operates according to a first trajectory of a plurality of trajectories. The environment can include a road user at a location. In some embodiments or examples, the operations include obtaining a rule indicative of a target expressive operation of the autonomous vehicle in proximity of the road user, the rule comprising a first criterion for initiation of application of the rule, and a second criterion. In one or more examples, the second criterion is for detecting the satisfaction of the rule. In some embodiments or examples, the operations include determining whether the sensor data meets the first criterion. In some embodiments or examples, the operations include applying the rule in response to the sensor data meeting the first criterion. In some embodiments or examples, applying the rule includes determining, based on the sensor data and the second criterion, a violation. In some embodiments or examples, the operations include evaluating, using the at least one processor, based on the violation metric, the first trajectory of the autonomous vehicle. In some embodiments or examples, the operations includes selecting, using the at least one processor, based on the violation metric, a second trajectory from the plurality of trajectories.

The term trajectory can be seen as a path to navigate an AV from a first location to a second location. A trajectory can be seen as a sequence of actions connecting states along with an autonomous vehicle can navigate. A trajectory can be seen as a maneuver, such as a lane change, and/or navigating via crosswalk. A location can be seen as a spatiotemporal location. In one or more examples, the first location is referred to as the initial or starting location and the second location is referred to as the destination, final location, goal, goal position, or goal location. In one or more examples, a trajectory includes one or more segments (e.g., sections of road) and each segment includes (e.g., is associated with) one or more blocks (e.g., portions of a lane or intersection). In one or more examples, the locations correspond to real world locations. For example, the locations can include pick up locations and/or drop-off locations to pick up and/or drop-off persons or goods.

The system 500 (e.g., AV compute 540) can be seen as a system for expressive operation, such as for expressive yielding. For example, the system 500 can be seen as an expressive system. For example, the system 500 is "expressive" in that the system operates the AV in a manner that conveys intent to a road user in the environment (e.g., other vehicles, pedestrians, cyclists, traffic controller etc.). Intent can be seen as purpose, goal, and/or target, which can be communicated as an operation, e.g. to follow a trajectory. For example, the system 500 is "expressive" in that the system conveys an operational state of the AV to a road user in the environment (e.g., an object, other vehicles, pedestrians, cyclists, traffic controller etc.).

In one or more examples, the communication of the system 500 can be seen as "expressive" communication, that is in the form of an expressive maneuver (e.g., involving one or more trajectories and/or one or more operations of the AV, such as a deceleration, an acceleration, or a steering behavior (e.g., a steering angle variation) of the AV, e.g. via control features of the AV). In one or more examples, the "expressive" communication can include an expressive indication (e.g., involving one or more of: speaker, light, and display of the AV). For example, the expressive communication can include a trajectory, e.g. including one or more of: a deceleration, an acceleration, and a steering behavior without involving one or more speakers, lights, or displays of the AV or can include a deceleration, an acceleration, or a steering behavior in addition to involving one or more of: speaker, light, and display of the AV.

For example, the system 500 can be configured to apply a rule indicative of a target expressive operation in response to the sensor data (e.g. sensor data 503) meeting a first criterion. This can provide an expressive indication of motion to a road user on an action that the autonomous vehicle may take. The system 500 can be configured to evaluate an action or operation taken by the autonomous vehicle, such as the expressive indication of motion, to determine whether a rule has been violated or not, such as due to conflicts in rules of the system 500.

The sensor data 503 can be one or more of: radar sensor data associated with a radar image, image sensor data associated with an image, audio sensor data associated with a sound, and LIDAR sensor data associated with a point cloud. The particular type of sensor data is not limiting. The sensor data 503 can be indicative of an environment around an autonomous vehicle. For example, the sensor data 503 can be indicative of an object, and/or a plurality of objects, in the environment around an autonomous vehicle. In particular, the sensor data 503 can be indicative of the environment in which an autonomous vehicle operates according to a first trajectory of a plurality of trajectories. For example, the sensor data 503 is indicative of a road user at a location. For example, the sensor data 503 is indicative of a road user at a location when the autonomous vehicle travels or plans to continue to travel according to the first trajectory.

The sensor, such as sensor 502, can be one or more sensors associated with the autonomous vehicle, such as an onboard sensor. An autonomous vehicle can include one or more sensors that can be configured to generate sensor data used to monitor an environment where the autonomous vehicle operates, such as via the sensor 502. For example, the one or more sensors can generate sensor data 503 indicative of what is happening in the environment around the autonomous vehicle, such as for determining one or more trajectories of the autonomous vehicle. The sensor 502 can be one or more of the sensors illustrated in FIG. 2. The sensor, such as sensor 502 can be one or more of: a radar sensor, a non-radar sensor, a camera sensor, a microphone, an infrared sensor, an image sensor, and a LIDAR sensor. In some embodiments or examples, the sensor 502 can be selected from the group consisting of a radar sensor, a camera sensor, and a LIDAR sensor. The type of sensor is not limiting.

The environment can be an environment, such as an area, in which the autonomous vehicle is operating. The environment can include any and/or all features of FIG. 1. The sensor data, such as sensor data 503, can be indicative of certain aspects, such as zones, locations, segments, portions, etc., of the environment. For example, the sensor data is indicative of one or more of a road user, a road segment, a road boundary, objects within the environment, a lane boundary, a crosswalk, and a non-crosswalk. The particular aspects of the environment indicative of by the sensor data are not limiting. The environment can include a road user. The sensor data 503 can be indicative of a road user. A road user can be an object in the environment as indicated by the sensor data. A road user can be one or more of a vehicle, a bicycle, and a pedestrian. For example, a road user can be a pedestrian at a crosswalk. A road user can be a dynamically moving object in the environment as indicated by the sensor data. A road user can be considered an agent. An agent, such as a road user, can be a physical object located in the environment. Agents can include one or more physical objects located in the environment. The type of agent can be set by a system or a user. The type of agent can be determined automatically, such as through sensing and machine learning. In some embodiments or examples, an agent can be an object capable of a dynamic movement over time. An agent can be any object that is captured by a sensor, such as sensor 502, or included in a sensor data, such as the sensor data 503. In some embodiments or examples, the road user is one or more of: a user-operated vehicle and a pedestrian. A road user is not so limited, and can be one or more of a pedestrian, a jaywalker, a traffic controller, a cyclist, a user-operated vehicle, a user-operated scooter, a user-operated car, a user-operated truck, and a user-operated motorcycle. The road user may not be another autonomous vehicle. The sensor data 503 can be indicative of a road object, such as a traffic light, a cross-walk etc.

The sensor data, such as sensor data 503, can be indicative of the road user at a location. The location can be a location in the environment. A location can be a portion, such as a section, of an environment. A location can be one or more of a crosswalk, pavement near a crosswalk, and a road part. The location can be seen as the location of the road user, such as a location surrounding the road user, such as an area associated with the road user. In one or more examples, the sensor data is indicative of a user-operated vehicle and/or a pedestrian (e.g., a road user) at a crosswalk (e.g., a location). In some embodiments or examples, the location of the road user includes an area surrounding the location of the road user.

The system 500 can be configured to operate the autonomous vehicle according to one or more of a plurality of trajectories. For example, the system 500 can use control system 510, which can be similar to control system 408 of FIG. 4. The system 500 can be configured to generate and/or plan the plurality of trajectories, such as in planning system 508, which can be similar to planning system 404 of FIG. 4. For example, the plurality of trajectories includes potential trajectories that the system 500 could operate the autonomous vehicle to follow. For example, the plurality of potential trajectories can be seen as candidate trajectories, e.g. to be selected by the AV.

The plurality of trajectories can include one or more of speed, acceleration, and direction that an autonomous vehicle can operate. The system 500 can be configured to determine the plurality of trajectories. The plurality of trajectories can include a first trajectory. The plurality of trajectories can include a second trajectory and optionally a third trajectory, and optionally a fourth trajectory. The number of trajectories in the plurality of trajectories is not limiting. The plurality of trajectories can include one or more trajectories that are coincident in time, for example potential trajectories that can occur at the same time. The plurality of trajectories can include one or more trajectories that are sequential in time.

In some embodiments or examples, the system 500 is configured to determine, based on the sensor data, an area surrounding the location of the road user. For example, the area can include a boundary around the road user. The area can include a horizontal plane around the road user. The area can be a vertical plane around the road user. The area can include a horizontal and a vertical plane around the user, such as defining a rectangular, and/or polygonal, area. The area can be centered around the road user. The area may not be centered around the road user. The system 500 can be configured to determine, based on the sensor data, a volume surrounding the location of the road user, e.g. including the horizontal and the vertical plane around the user. For example, the system 500 determines a location including a horizontal area of three square meters centered at the road user. In some embodiments or examples, the area surrounding the location of the road user comprises a zone for communicating intent of a maneuver of the autonomous vehicle. The zone can include an area in which a road user can perceive the autonomous vehicle and/or an area in which a road user can visually see the autonomous vehicle, and/or an area in which a road user can auditorily hear the autonomous vehicle; and/or an area in which an autonomous vehicle can express an intent to a road user; and/or an area in which an autonomous vehicle can communicate expressively to a road user, and/or an area in which a road user can understand target expressive operation, such as an expressive intent, of the autonomous vehicle. For example, a zone is a zone for an expressive autonomous vehicle which can be seen as an expressive robot.

A target expressive operation can be seen as indicative of an operation of the autonomous vehicle as operated by the system 500, wherein the operation is configured to communicate an intent of the AV. The target expressive operation may include an operation of the AV indicative of an expressive intent of the autonomous vehicle. The target expressive operation may be seen as a maneuver of the autonomous vehicle, such as a maneuver in accordance with a trajectory. For example, a target expressive operation can be seen as an operation indicative of one or more of control operations, such as one or more speeding up, slowing down, continuing at speed, and changing direction of the autonomous vehicle.

In some embodiments or examples, the system 500 is configured to obtain a rule indicative of a target expressive operation of the autonomous vehicle in proximity of the road user and/or the location (e.g. crosswalk). The rule may be part of a rule system 504. The system 500 may optionally include perception system 506, which can include the rule system 504. The system 500 can be configured to forgo obtaining a rule indicative of a target expressive operation of the autonomous vehicle when the sensor data does not indicate that the AV is in proximity of the road user and/or the location.

For example, the system 500 may only obtain a rule when the sensor data indicates that the autonomous vehicle is within a proximity of the road user. The proximity of the road user can be an area around the road user, such as a horizontal area. The system 500 can determine the boundaries of the proximity. The system 500 can obtain different proximity sizes depending on the rule. Proximity can be seen as within a sensing range of a sensor, such as sensor 502, providing the sensor data 503. The proximity may be defined based on a distance to the road user and/or to an area associated with the road user. A proximity range may be defined based on the autonomous vehicle range to the road user and/or to an area associated with the road user. The proximity range of the road user can be the same as a range from AV to the zone for communicating intent of a maneuver of the autonomous vehicle. The proximity range of the road user can be different than the zone for communicating intent of a maneuver of the autonomous vehicle.

A rule indicative of a target expressive operation of the autonomous vehicle can be seen as a rule that evaluates and optionally enforces an expressive operation of the AV e.g. by selecting a trajectory based on a violation metric indicative of a non-violation of the rule. For example, a rule indicative of a target expressive operation of the autonomous vehicle can be seen as a rule configured to promote an operation of the AV, such as a particular behavior of the AV near a road user. A rule indicative of a target expressive operation of the autonomous vehicle can be seen as an expressive rule, such as a rule for expressive yielding. The rule indicative of the target expressive operation can include a rule scope and/or a rule statement. The rule scope can include the first criterion for initiating application of the rule. The first criterion may be seen as an entry criterion for entering the rule. The rule statement can include a second criterion for detecting the satisfaction of the rule. A rule may include one or more criterion related to a set of operations, such as actions, boundaries, and/or constraints, that the system 500 can be configured to operate the vehicle within. The rule may be based on evaluating an operation of the autonomous vehicle by the system 500 with respect to one or more criteria. A rule can detect whether an operation has been an expressive operation, such as an expressive maneuver, of the autonomous vehicle by the system 500. The rule can be configured to detect whether an operation of the autonomous vehicle by the system 500 is a violation. The rule may be obtained from a plurality of rules, such as a list of rules and/or a database of rules. The rule may be obtained from a single rule.

In some embodiments or examples, the system 500 is configured to determine whether the sensor data 503 meets the first criterion. The system 500 can be configured to apply the rule in response to the sensor data meeting the first criterion. For example, in response to the sensor data meeting the first criterion the system 500 can be configured to apply the rule for evaluating whether an operation of the autonomous vehicle captured by the sensor data satisfies the rule. For example, the application of rules can involve evaluation of how the autonomous vehicle slowed down when arriving at a crosswalk based on the sensor data. For example, an expressive operation of the AV can provide clear signal to a road user that they could cross the crosswalk. The target expressive operation can include an expressive stopping and/or an expressive yielding. The target expressive operation may be seen as an operation that is targeted by the system so as to enable the AV to express intent to the road user, such as the intent to yield to the road user. In some embodiments or examples, the target expressive operation of the autonomous vehicle in proximity of the road user includes yielding at a crosswalk. For example, the system 500 can be configured to operate the autonomous vehicle to yield, such as slow down, when approaching a road user, such as at and/or before a crosswalk. For example, the system 500 can be configured to operate the autonomous vehicle to yield, such as slow down, when approaching a jaywalker, a traffic controller and/or a cyclist. The rule can be seen as an expressive rule, such as an expressive yielding rule.

The rule can include the first criterion for application of the rule. The first criterion can be seen as an entry criterion.

For example, the first criterion is used to determine when to apply a rule. For example, the first criterion is used to initiate the rule (e.g., initiate operation of the autonomous vehicle in accordance with the rule) and/or enter the rule. For example, when the system 500 determines that the sensor data meets the first criterion, the system 500 applies the rule. When the sensor data does not meet the first criterion, the system 500 may not initiate application of the rule. For example, when the sensor data does not meet the first criterion, the system 500 may forgo applying the rule.

For example, the system 500 can determine that the sensor data meets the first criterion, such as satisfied, when the sensor data indicates that the autonomous vehicle is in proximity of the road user and/or the location (e.g. crosswalk). For example, the system 500 can determine that the sensor data meets the first criterion, such as satisfied, when the sensor data is indicative of the presence of the road user. For example, the system 500 can determine that the sensor data meets the first criterion, such as satisfied, when the sensor data is indicative of the presence of the location, such as a crosswalk.

The rule can also include a second criterion. The second criterion can be used for detection whether the rule has been satisfied, such as met, by the system 500, such as by the operation of the autonomous vehicle. When the system 500 determines that the second criterion is met, the rule can be considered satisfied. When the system 500 determines that the second criterion is not met, the rule can be considered as not satisfied. The system 500 can be configured to determine whether the sensor data meets the second criterion. For example, when the system 500 determines that the sensor data meets the second criterion, the rule can be considered satisfied. When the system 500 determines that the sensor data does not meet second criterion, the rule can be considered as not satisfied.

In some embodiments or examples, the system 500 is configured to determine whether the sensor data meets the first criterion. The system 500 can be configured to forgo applying the rule in response to the system 500 determining that the sensor data does not meet the first criterion. The system 500 can be configured to apply the rule in response to the system 500 determining that the sensor data does meet the first criterion.

Applying the rule can include evaluating an operation of the autonomous vehicle by the system 500. Applying the rule can include determining based on the sensor data and the second criterion, a violation metric. The system 500 can be configured to determine, based on the sensor data and the second criterion, a violation metric. A violation metric can be seen as a metric indicative of a violation or a zero violation (such as a non-violation) of the rule. The violation metric can include a parameter quantifying the violation. For example, the violation metric can include a weight parameter quantifying the violation.

In response to the system 500 determining that the sensor data meets the second criterion, the system 500 can determine a violation metric indicative of a zero violation. In response to the system 500 determining that the sensor data does not meet the second criterion, the system 500 can determine a violation metric indicative of a violation. In response to the system 500 determining that the sensor data does not meet the second criterion, the system 500 can determine a violation metric as indicative of a violation distance parameter. A violation can be a violation of a rule. A rule can be violated, for example if the system 500 operates the autonomous vehicle in response to a higher priority rule than the present rule.

In some embodiments or examples, the system 500 is configured to evaluate, based on the violation metric, the first trajectory of the autonomous vehicle. The system 500 can be configured to evaluate the first trajectory of the autonomous vehicle during operation of the autonomous vehicle along the first trajectory. The system 500 can be configured to evaluate the first trajectory of the autonomous vehicle after operation of the autonomous vehicle along the first trajectory. The evaluation can be advantageous for assessment of a system 500 of an autonomous vehicle to reinforce expressive operation of the AV.

In some embodiments or examples, to evaluate, using the at least one processor, based on the violation metric, the first trajectory of the autonomous vehicle is performed after completion of the first trajectory. For example, the system 500 can be backward looking and configured to evaluate operation of the autonomous vehicle after the operation of the autonomous vehicle has occurred. For example, the system 500 can be backward looking and configured to evaluate the first trajectory of the autonomous vehicle after the first trajectory of the autonomous vehicle has been travelled.

In some embodiments or examples, the system 500 is configured to select, based on the violation metric, a second trajectory from the plurality of trajectories. The second trajectory can be different from the first trajectory. The second trajectory can be used in the planning system 508, which may be similar to the planning system 404 discussed with respect to FIG. 4. The second trajectory can be the same as the first trajectory.

The first criterion can be a number of different types of criterion. The first criterion can include one or more criterion, such as discussed herein. The first criterion can include a plurality of criterion to be met in order for the system 500 to apply the rule, e.g. to enter the rule. The first criterion can include a single criterion to be met in order for the system 500 to apply the rule. The first criterion can be met when one or more conditions are met.

In some embodiments or examples, the sensor data meets the first criterion, in response to the sensor data indicating that the autonomous vehicle is in proximity of the road user and/or the location (e.g. a crosswalk). For example, when the sensor data indicates that the autonomous vehicle is in proximity of the road user and/or the location (e.g. a crosswalk), the system 500 determines that the sensor data meets the first criterion.

For example, the system 500 can obtain sensor data indicative of a road user. The first criterion can be whether the sensor data is indicative of the road user being in a proximity of the autonomous vehicle and/or of the location (e.g. a crosswalk). In accordance with the system 500 obtaining sensor data 503 indicative that the autonomous vehicle is in proximity of the road user and/or the location (e.g. a crosswalk), the system 500 determines that the sensor data 503 meets the first criterion. In accordance with the system 500 obtaining sensor data 503 indicative that the autonomous vehicle is not in proximity of (e.g., within a distance from) the road user and/or the location (e.g. a crosswalk), the system 500 determines that the sensor data meets 503 meets the first criterion.

For example, the system 500 can operate the autonomous vehicle to approach a crosswalk. The system 500 can obtain sensor data indicative of a road user, such as a jaywalker, a cyclist, and/or a traffic controller, being at a location of the crosswalk, and determine that the sensor data 503 meets the first criterion.

In one or more examples, the first criterion includes one or more conditions, e.g. including a first condition. In other words, the first criterion can include a first condition that is met when the sensor data indicates that the autonomous vehicle is in proximity of the road user and/or the location (e.g. a crosswalk). Within proximity is, for example, within 30 meters, within 20 meters, within 10 meters of the road user and/or the location. In one or more examples, the sensor data meets the first criterion, when the sensor data meets the first condition.

In some embodiments or examples, the sensor data meets the first criterion in response to the sensor data indicating that the autonomous vehicle is in a lane closest to a road boundary. For example, when the sensor data indicates that the autonomous vehicle is in a lane closest to a road boundary, the system 500 determines that the sensor data meets the first criterion.

A road boundary can be a boundary of a road. For example, a road boundary is a shoulder and/or a median. A road boundary can be a location where a drivable road ends. The system 500 can be configured to obtain sensor data indicative of a lane in which the autonomous vehicle is operating in. In response to the sensor data being indicative of the autonomous vehicle being in the lane closest to the lane boundary, the system 500 can determine that the sensor data meets the first criterion. In response to the sensor data being not indicative of the autonomous vehicle being in the lane closest to the lane boundary, the system 500 can determine that the sensor data does not meet the first criterion.

For example, when the sensor data can be indicative of the autonomous vehicle being in the rightmost lane closest to the lane boundary, the system 500 can determine that the sensor data meets the first criterion. For example, when the sensor data can be indicative of the autonomous vehicle being in the leftmost lane closest to the lane boundary, the system 500 can determine that the sensor data meets the first criterion.

In other words, the first criterion can include a second condition that is met when system 500 obtains sensor data indicative that the autonomous vehicle is in a lane closest to a road boundary, e.g. rightmost or leftmost lane closest to the road boundary and/or to the lane boundary. In one or more examples, the sensor data meets the first criterion, when the sensor data meets the second condition.

In some embodiments or examples, the sensor data meets the first criterion in response to the sensor data indicating that the road user is off a road surface. A road surface can be a drivable road surface. A road surface can be a surface in which the system 500 is configured to operate the autonomous vehicle.

In some embodiments or examples, the system 500 is configured to obtain sensor data indicative of a road user being off a road surface. In response to the sensor data being indicative of the road user being off the road surface, the system 500 can determine that the sensor data meets the first criterion. In response to the sensor data being not indicative of the road user being off the road surface, the system 500 can determine that the sensor data does not meet the first criterion.

For example, the system 500 can obtain sensor data indicative of a pedestrian being off the road surface. In other words, the first criterion can include a third condition that is met when the system 500 obtains sensor data indicative that the road user is off the road surface. In one or more examples, the sensor data meets the first criterion, when the sensor data meets the third condition.

In some embodiments or examples, the sensor data meets the first criterion in response to the sensor data indicating that the road user is in a lane closest to a road boundary.

In some embodiments or examples, the system 500 is configured to obtain sensor data indicative of the road user being in a lane closest to the road boundary. In response to the sensor data being indicative of the road user being in a lane closest to the road boundary, the system 500 can determine that the sensor data meets the first criterion. In response to the sensor data being not indicative of the road user being in a lane closest to the road boundary, the system 500 can determine that the sensor data does not meet the first criterion.

For example, the system 500 can obtain sensor data indicative of a pedestrian in the rightmost lane nearest a road boundary. In other words, the first criterion can include a fourth condition that is met when the system 500 obtains sensor data indicative that the road user is in a lane closest to a road boundary. In one or more examples, the sensor data meets the first criterion, when the sensor data meets the fourth condition.

In some embodiments or examples, the sensor data meets the first criterion in response to the sensor data indicating that a distance between the location of the road user and a location of a crosswalk does not meet a distance threshold.

In some embodiments or examples, the system 500 is configured to obtain sensor data indicative of a distance between the location of the road user and a location of the crosswalk. In response to the sensor data being indicative of the distance being below the distance threshold, the system 500 can determine that the sensor data meets the first criterion as met. In response to the sensor data being indicative of the distance being at and/or above the distance threshold, the system 500 can determine that the sensor data does not meet the first criterion.

In other words, the first criterion can include a fifth condition that is met when the system 500 obtains sensor data indicative that a distance between the location of the road user and a location of a crosswalk is below a distance threshold. For example, the pedestrian can be located within a particular distance threshold from the location of a crosswalk. The distance can be 0.5 m, 1 m, 5 m, and/or 10 m. In one or more examples, the sensor data meets the first criterion, when the sensor data meets the fifth condition.

In one or more examples, the sensor data meets the first criterion, when the sensor data meets the first condition and/or the second condition and/or the third condition and/or the fourth condition and/or the fifth condition. In one or more examples, the sensor data meets the first criterion, when the sensor data meets the first condition and the second condition and the fifth condition. In one or more examples, the sensor data meets the fifth condition, when the sensor data meets the third condition or the fourth condition. In some embodiments or examples, to determine whether the sensor data meets the first criterion includes determining that the sensor data meets the first criterion in accordance with the sensor data being indicative of the location of the road user being in the vicinity of a crosswalk.

In some embodiments or examples, the system 500 is configured to obtain sensor data indicative of a location of the road user and a location of a crosswalk. The sensor data can be indicative of a distance between the road user and the crosswalk. In response to the sensor data being indicative of the distance being below the distance threshold, the system 500 can determine the first criterion as met. In response to the sensor data being indicative of the distance being at and/or above the distance threshold, the system 500 can determine the first criterion as not met.

In some embodiments or examples, determining, using the at least one processor, based on the sensor data and the second criterion, the violation metric includes determining, using the at least one processor, whether the sensor data meets the second criterion. The system 500 can be configured to determine whether the sensor data does not meet the second criterion.

In some embodiments or examples, determining, using the at least one processor, whether the sensor data meets the second criterion includes determining, using the at least one processor, based on the sensor data, a stop distance parameter indicative of a distance between a location of the autonomous vehicle and the location of the road user when the autonomous vehicle reaches a stop. In some embodiments or examples, to determine, using the at least one processor, whether the sensor data meets the second criterion includes determining, using the at least one processor, whether the stop distance parameter is below a threshold (e.g. different from the distance threshold). In some embodiments or examples, to determine, using the at least one processor, whether the sensor data meets the second criterion includes determining that the sensor data does not meet the second criterion in response to the stop distance parameter being below the threshold.

In some embodiments or examples, the system 500 is configured to obtain sensor data indicative of a distance between a location of the autonomous vehicle and a location of the road user when the autonomous vehicle reaches a stop. The system 500 can be configured to determine a stop distance parameter indicative of the distance. For example, the stop distance parameter includes the distance between a location of the autonomous vehicle and a location of the road user when the autonomous vehicle reaches a stop.

In response to the sensor data being indicative of the stop distance parameter being below the threshold, the system 500 can determine that the sensor data does not meet the second criterion. In response to the stop distance parameter being indicative of the distance being at and/or above the distance threshold, the system 500 can determine that the sensor data meets the second criterion. The distance threshold can be seen as an expressive threshold, such as an expressive yielding threshold.

In response to the sensor data not meeting the second criterion, such as the stop distance parameter being indicative of a distance below the threshold, the system 500 can be configured to determine a violation metric indicative of a violation. In response to the sensor data meeting the second criterion, such as the stop distance parameter being indicative of a distance at and/or above the threshold, the system 500 can be configured to determine a violation metric indicative of a zero violation.

In some embodiments or examples, to determine, using the at least one processor, based on the sensor data and the second criterion, the violation metric includes to determine the violation metric as indicative of zero violation, in response to the sensor data meeting the second criterion.

In some embodiments or examples, to determine, using the at least one processor, based on the sensor data and the second criterion, the violation metric includes determining the violation metric as indicative of a violation distance parameter in response to the sensor data not meeting the second criterion. A violation distance parameter can be a violation metric indicative of a violation, such as quantifying the violation.

In some embodiments or examples, the violation distance parameter includes a distance by which the stop distance parameter does not satisfy the threshold. The system 500 can be configured to determine, based on the sensor data, a quantifiable amount of distance by which a rule has been violated. For example, the system 500 can determine a distance by which the stop distance parameter does not satisfy the threshold based on sensor data indicative of a distance by which the autonomous vehicle has stopped below the threshold, such as a difference between the threshold and the stop distance parameter. For example, the violation distance parameter includes a distance by which the stop distance parameter sub-ceeds (e.g. is inferior to, and/or falls short of) the threshold.

In one more example systems, the system 500 is configured to control, using the at least one processor, the autonomous vehicle based on the selected second trajectory. The system 500 can be configured to express a particular operation of the autonomous vehicle to the road user based on the rule (e.g., a target expressive operation) such as by controlling the autonomous vehicle based on the selected second trajectory.

In some embodiments or examples, the system 500 is configured to perform operations including controlling the autonomous vehicle based on the first trajectory. The system 500 can be configured to generate, based on the second trajectory and/or the violation metric, control data associated with control of autonomous vehicle. For example, the system can be configured to transmit the control data to a controller of the autonomous vehicle and/or to actually operate the autonomous vehicle.

In one or more embodiments or examples, the system 500 is configured to control the autonomous vehicle by generating control data for a control system of an autonomous vehicle. In one or more embodiments or examples, the system 500 is configured to control the autonomous vehicle by providing control data to a control system of an autonomous vehicle. In one or more embodiments or examples, the system 500 is configured to control the autonomous vehicle by transmitting control data to, e.g., a control system of an autonomous vehicle and/or an external system. In one or more embodiments or examples, the system 500 is configured to control the autonomous vehicle by controlling, based on control data, a control system of an autonomous vehicle and/or an external system. Controlling operation of the autonomous vehicle can be performed by the system 500 in control system 510.

In some embodiments or examples, the at least one non-transitory computer readable medium store instructions that, when executed by the at least one processor, cause the at least one processor to perform operations including determine, using the at least one processor, a total violation metric for one or more (e.g. all) locations to which the rule applied. For example, the system 500 can be configured to combine some and/or all violation metrics indicative of a violation. As an example, the system 500 applies a square root of the sum of violations for all crosswalks to which the rule is applied. Other methods of determining a total violation metric can be used as well.

In some embodiments or examples, the at least one non-transitory computer readable medium store instructions that, when executed by the at least one processor, cause the at least one processor to perform operations including provide, using the at least one processor, data indicative of the total violation metric, for control of the autonomous vehicle. The system 500 can be configured to transmit data indicative of the total violation metric. The system 500 can be configured to generate data indicative of the total violation metric. The system 500 can be configured to transmit data indicative of the total violation metric outside of the system 500.

In some embodiments or examples, the at least one non-transitory computer readable medium store instructions that, when executed by the at least one processor, cause the at least one processor to perform operations including select, using the at least one processor, based on the total violation metric, the second trajectory from the plurality of trajectories.

In some embodiments or examples, the rule includes a third criterion to exit the rule. In response to the system 500 obtaining sensor data meeting the third criterion, the system 500 can be configured to exit the rule, such as stop (e.g., cease, forgo, and/or the like) applying the rule. In response to the system 500 obtaining sensor data not meeting the third criterion, the system 500 can be configured to not exit the rule, such as continue applying the rule. For example, system can determine that the sensor data meets the third criterion when the sensor data stops indicating presence of the road user in vicinity of the autonomous vehicle.

Figure 6:
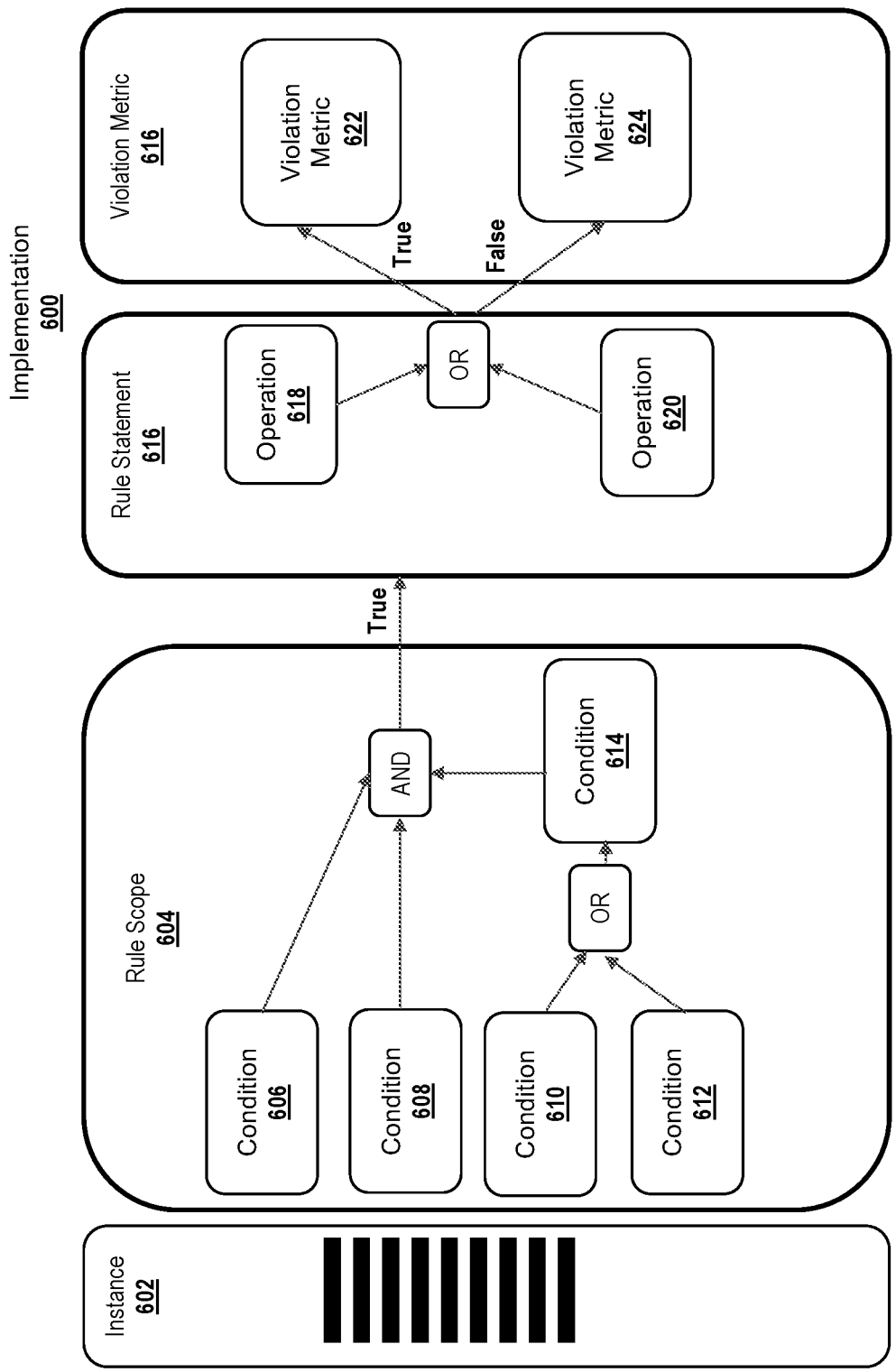
FIG. 6 is a diagram of an example implementation of a process for autonomous vehicle yielding.

Referring now to FIG. 6, FIG. 6 shows a diagram of an example implementation 600 of a process for autonomous vehicle yielding, such as of a rule system, such as rule system 504 of FIG. 5. As shown, a system, such as system 500, can obtain sensor data indicative of a crosswalk, shown as an instance in FIG. 6. Further, the system can obtain sensor data indicative of a road user at a location.

The system can obtain a rule indicative of a target expressive operation of the autonomous vehicle in proximity of the road user, the rule including a first criterion for initiation of application of the rule. The rule can have an example rule scope 604 shown in FIG. 6 that includes example first criterion such as discussed herein. The rule scope can include a condition 606 which is met when the sensor data indicates that the autonomous vehicle (e.g., ego) is the closest vehicle approaching the crosswalk. Condition 606 may be seen as the first condition, for example as described for FIGS. 5 and 9. The rule scope can include a condition 608 which is met when the sensor data indicates that the autonomous vehicle is in the rightmost lane closest to the lane boundary. Condition 608 may be seen as the second condition, for example as described for FIGS. 5 and 9. The rule scope can include a condition 610 which is met when the sensor data indicates that a road user (e.g., pedestrian) is off the road surface (e.g. on the pavement, or sidewalk). Condition 610 may be seen as the third condition, for example as described for FIGS. 5 and 9. The rule scope can include a condition 612 which is met when the sensor data indicates that a road user (e.g., pedestrian) is in the rightmost lane. Condition 612 may be seen as the fourth condition, for example as described for FIGS. 5 and 9. The rule scope can include a condition 614 which is met when the sensor data indicates that the road user (e.g., pedestrian) is within a certain distance from the crosswalk (e.g., a distance threshold). Condition 614 may be seen as the fifth condition, for example as described for FIGS. 5 and 9.

In one or more examples, the first criterion can include one or more of: condition 608, condition 606, condition 610, condition 612, and condition 614. For example, the first criterion can be met in accordance with the system 500 obtaining sensor data indicative of the autonomous vehicle (e.g., ego) being the closest vehicle to the approaching crosswalk illustrated by condition 606. The first criterion can be met in accordance with the system obtaining sensor data indicative of the autonomous vehicle being in the rightmost lane closest to the lane boundary illustrated by condition 608.

Further, the first criterion can be met in accordance with the system obtaining sensor data indicative of a road user (e.g., pedestrian) being off the road surface illustrated by condition 610. or a road user (e.g., pedestrian) being in the rightmost lane as illustrated by condition 612, and that the road user (e.g., pedestrian) is within a certain distance from the crosswalk (e.g., a distance threshold) illustrated by condition 614.

In FIG. 6, the first criterion is met when conditions 606, 608, and 614 are met. For example, condition 614 is checked when condition 610 or 612 are met. In FIG. 6, the first criterion is met when conditions 606, 608, 610 and 614 are met. In FIG. 6, the first criterion is met when conditions 606, 608, 612 and 614 are met. When conditions 606, 608, and 614 of the first criterion are met, the system can apply the rule, such as shown in the Rule Statement 616 of FIG. 6.

The system can operate the autonomous vehicle, such as via a trajectory of the plurality of trajectories, such as the first trajectory or the second trajectory. For example, the system can be configured to operate the autonomous vehicle to maintain a certain clearance from the crosswalk as illustrated in operation 618 and/or to stop the autonomous vehicle as illustrated in operation 620.

The system can determine a violation metric, based on the second criterion and the sensor data, indicative of a zero violation or a violation and evaluate the first trajectory of the autonomous vehicle based on the violation metric, such as shown in FIG. 6.

For example, when the sensor data is indicative of a stop distance parameter between the autonomous vehicle and the road user being at and/or above a threshold (illustrated by 618), the system determines the violation metric 622 as indicative of zero violation (true branch illustrated in FIG. 6). A determination of zero violation may be associated with, for example, the AV stopping or the autonomous vehicle maintaining a certain distance (e.g., a clearance) from the crosswalk. For example, when the sensor data is indicative of a stop distance parameter between the autonomous vehicle and the road user being at and/or above a threshold, the sensor data meets the second criterion, and the system can determine a violation metric indicative of a zero violation.

For example, when the sensor data is indicative of a stop distance parameter between the autonomous vehicle and the road user being below the threshold, the system determines the violation metric 624 as indicative of a violation (false branch illustrated in FIG. 6). For example, the AV has not stopped, or the autonomous vehicle has not maintained a certain clearance from the crosswalk. For example, when the sensor data is indicative of a stop distance parameter between the autonomous vehicle and the road user being below a threshold, the sensor data meets the second criterion, and the system can determine a violation metric indicative of a violation. This can be shown as a distance (m) with by which the stop distance parameter indicative of the autonomous vehicle's distance to the crosswalk sub-ceeds the threshold.

Figure 7A:
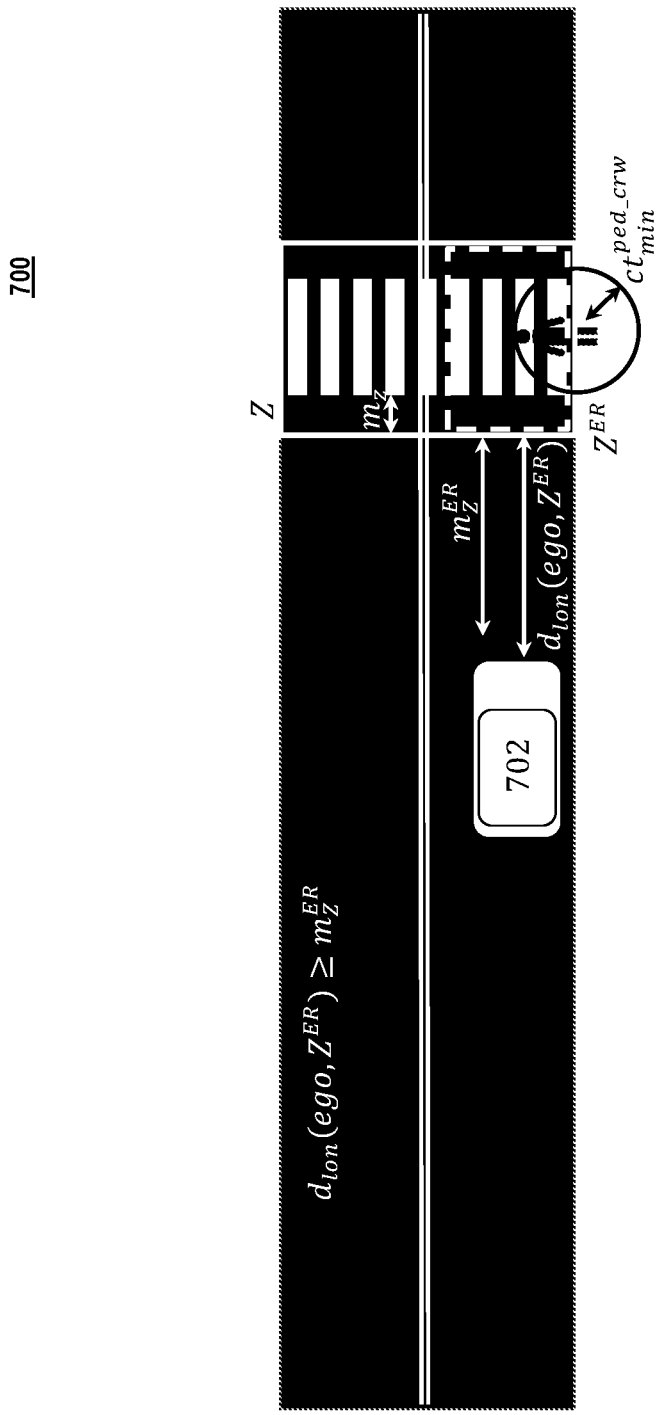
FIGS. 7A-7B is a diagram of an example implementation of a process for autonomous vehicle yielding.
Figure 7B:
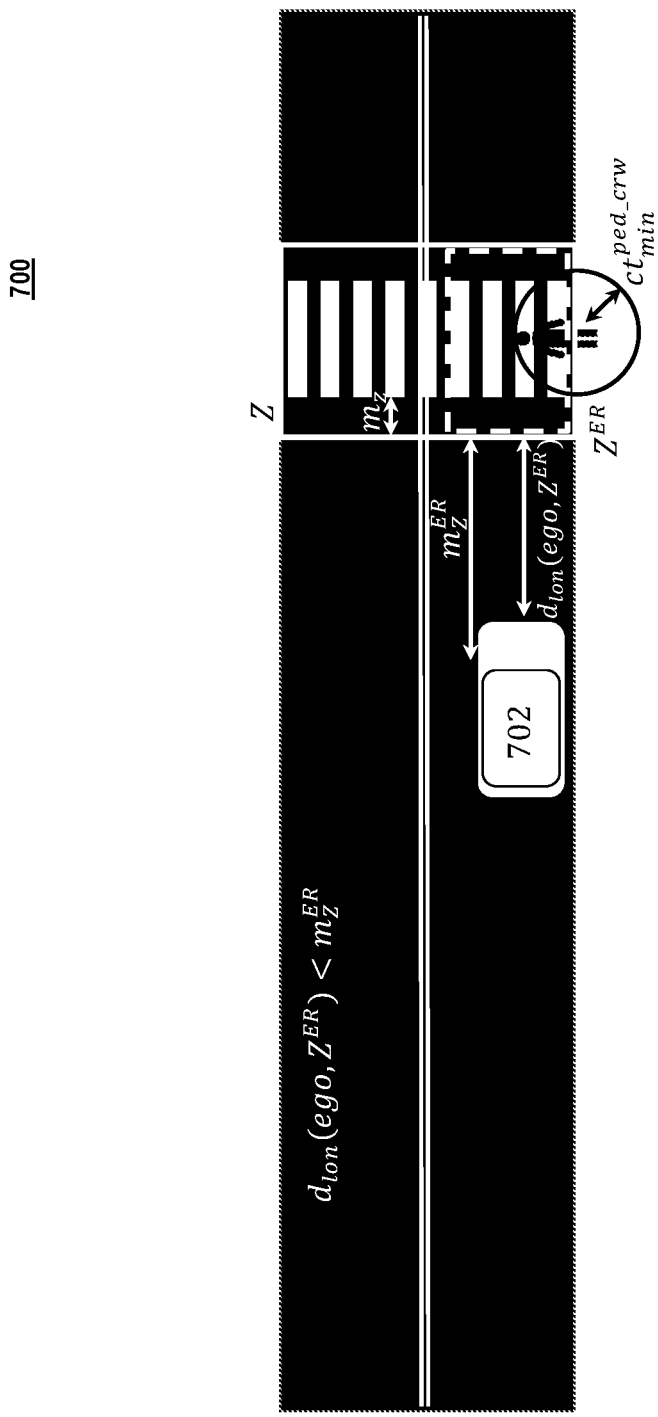

Referring now to FIGS. 7A-7B, FIGS. 7A-7B show a diagram of an example implementation 700 of a process for autonomous vehicle yielding with an autonomous vehicle 702. FIG. 7A illustrates a violation metric indicative of zero violation. FIG. 7B illustrates a violation metric indicative of a violation (bottom). For example, the autonomous vehicle 702 is too close to the crosswalk in FIG. 7B and therefore violates the rule, whereas the autonomous vehicle 702 is in a proper stopping location in FIG. 7A.

The violation metric can be determined as discussed herein. Discussed further is an example mathematical model which can be used for determining the violation metric.

For example, the rule applied by the system 500 can have a rule scope that can expressed e.g.:

$$\sigma_i(t): IN_{centroid}(lid_{rightmost}(lid(ego)(t)), ego)(t) \wedge$$

$$RP_{app,imm}(Z_i^{ER}, ego)(t) \wedge \exists_{j=1,\ldots,n_{ped}} C(i,j)(t)$$

where $$C(i,j)(t) = \{\neg rsu(ped_j)(t) \vee IN_{centroid}(lid_{rightmost}(lid(ego)(t)), ped_j)(t)\} \wedge$$

$$d_{tot}(ped_j, Z_i^{ER}) \leq ct_{min}^{ped\_crw}$$

and $$Z_i^{ER} = Z_i^p \cap lid_{rightmost}(lid(ego)(t)).$$

The rule scope C indicates that the rule applies with respect to a crosswalk if the autonomous vehicle is the closest vehicle approaching the crosswalk in the rightmost lane, and there exists one or more road users off the road surface or in the rightmost lane within a certain distance from a protected zone of the crosswalk.

The rule can include a rule statement regarding the satisfaction of a rule, which can be expressed as e.g.:

$$\varphi: \bigwedge_{i=1,\ldots,n_{crw}} \varphi_i$$

where $\varphi_i$: $G_{[0,T]}\{\sigma_i(t) \rightarrow v_{ego}(t)=0 \vee d_{lon}(ego, Z_i^{ER})(t) \geq m_x^{ER}\}$ A rule statement $\phi$ can indicate that the autonomous vehicle satisfies the rule if it satisfies the rule with respect to all crosswalks in the scenario. The autonomous vehicle can satisfy the rule with respect to an individual crosswalk ($\phi_i$) if whenever the rule applies with respect to that crosswalk, the autonomous vehicle is either stopped or maintains a certain clearance from the crosswalk.

An example instantaneous violation metric can be determined by the system, where the instantaneous violation pertains to a moment in time, t and can be expressed as e.g.:

$$\rho_i(t) = \{(m_x^{ER} - d_{lon}(ego, Z_i^{ER})(t))^2 \neg (v_{ego}(t) = 0 \vee d_{lon}(ego, Z_i^{ER})(t) \geq m_x^{ER})0$$

otherwise for crosswalk $i=1, \ldots, n_{crw}$ for which $\sigma_i(t)$

An example of a violation metric for a given crosswalk can be determined by the system in the following manner:

$$\rho_{T,i} = \max * \rho_i(t) \text{ for crosswalk } i=1, \ldots, \hat{n}_{crw} \text{ if } \hat{n}_{crw} \geq 1$$

The violation metric $\rho_{T,I}$ for a crosswalk that was in scope at any time during the operation (e.g., all the entry criterion were met so the rule was applied) is the maximum instantaneous violation of the autonomous vehicle with respect to that crosswalk over those time intervals when the crosswalk was in the vicinity.

The system can determine a total number of crosswalks that were in scope at any time during the scenario, e.g.:

$$\hat{n}_{crw} = \sum_{i=1}^{n_{crw}} 1_{\exists t \in [0,T]:\sigma_i(t)}$$

The system can determine a total violation metric $\rho_{total}$ (unit m) which can be expressed as e.g.:

$$\rho_{total} = \sqrt{\sum_{i=1}^{\hat{n}_{crw}} \rho_{T,i}}$$

Certain equations and/or mathematical formulations have been used herein, and may be used by the system, such as system 500. For example, a list of rule constants which can be used for any of the described equations:

| Symbol | Definition | Unit/Type |
|---|---|---|
| T | Scenario duration | s |
| $n_{crw}$ | Number of marked or unmarked crosswalks in a scenario | count |
| $n_{ped}$ | Number of pedestrians in a scenario | count |
| $lid_{rightmost}$(lane) | Rightmost lane (closest lane to the nondrivable area among all lanes in the lane group that includes lane lane (relative to specified direction of travel) | Boolean |

For example, a list of rule variables which can be used with any of the described equations:

| Symbol | Definition | Unit/Type |
|---|---|---|
| lid (veh)(t) | Lane in which the centroid of vehicle veh is at time t | area |
| rsu(ped)(t) | Boolean indicating whether pedestrian ped is on the road surface at time t | Boolean |
| $v_{ego}(t)$ | ego speed (=$\|v_{ego}(t)\|$) at time t | m/s |
| $IN_{centroid}$(lane, ego)(t) | Boolean indicating whether the centroid of the footprint of ego is in lane lane at time t | Boolean |
| $d_{lon}$(ego, $Z^{ER}$)(t) | Longitudinal distance between ego and protected zone $Z^{ER}$ at time t | m |
| $d_{tot}$(ped, $Z^{ER}$)(t) | Total distance between ped and protected zone $Z^{ER}$ at time t | m |
| $RP_{app,\,imm}(Z^{ER}, ego)(t)$ | Boolean indicating whether ego is the closest vehicle approaching protected zone $Z^{ER}$ at time t (relative to specified direction of travel) | Boolean |

For example, a list of rule parameters which can be used with any of the described equations:

| Symbol | Definition | Value and unit |
|---|---|---|
| $m_x$ | Margin of a crosswalk in the lane direction | 2 m |
| $m_x^{ER}$ | Clearance for a crosswalk in the lane direction for an expressive yielding | 5 m |
| $ct_{min}^{ped\_crw}$ | Clearance for pedestrians near a crosswalk | 0.5 m |

In one or more examples or embodiments, the autonomous vehicle 702 may be located between other agents, such as other vehicle, in the environment. In other situations, the autonomous vehicle 702 is located in front of or behind another agent. Similar to the discussion with respect to the rules for a scenario with a pedestrian and/or a crosswalk, rules can be applied for proper clearance between the autonomous vehicle 702 and other vehicles in the environment. The clearance may vary depending on whether the other vehicle is in front of the autonomous vehicle 702 or behind the autonomous vehicle 702. Further, the additional vehicles in the environment may affect the rules applied for a pedestrian and/or crosswalk.

Figure 8A:
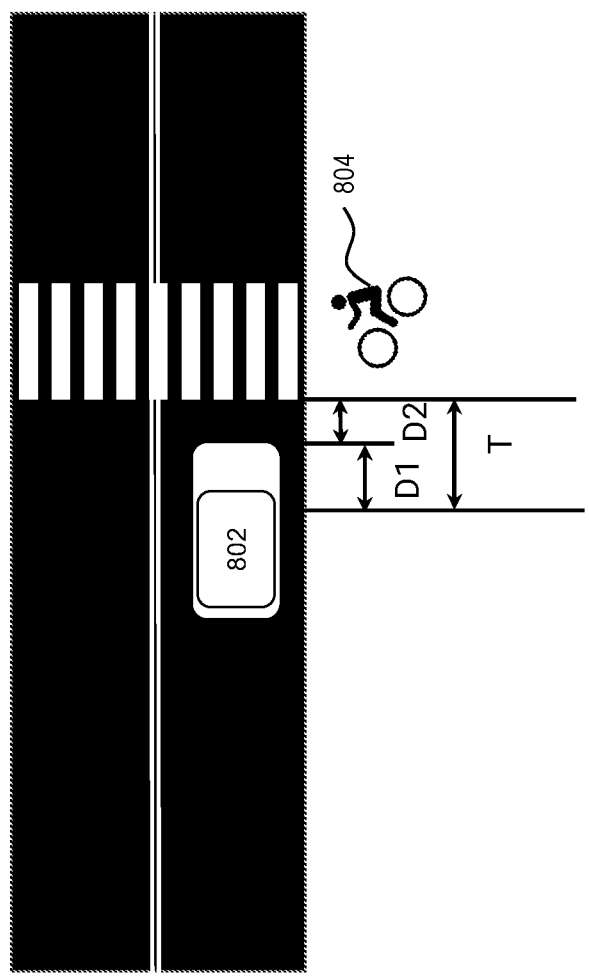
FIGS. 8A-8C are diagrams of an example implementation of a process for autonomous vehicle yielding.
Figure 8B:
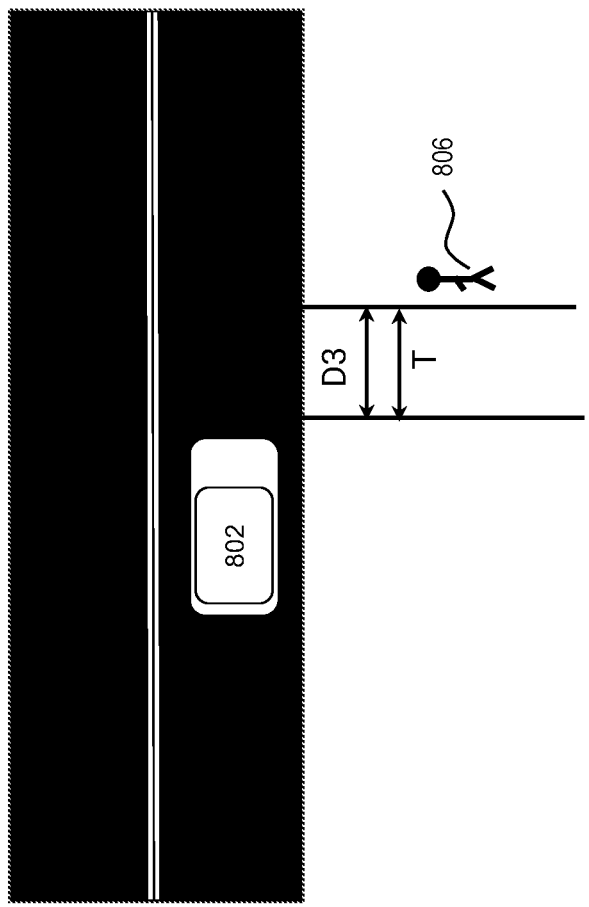
Figure 8C:
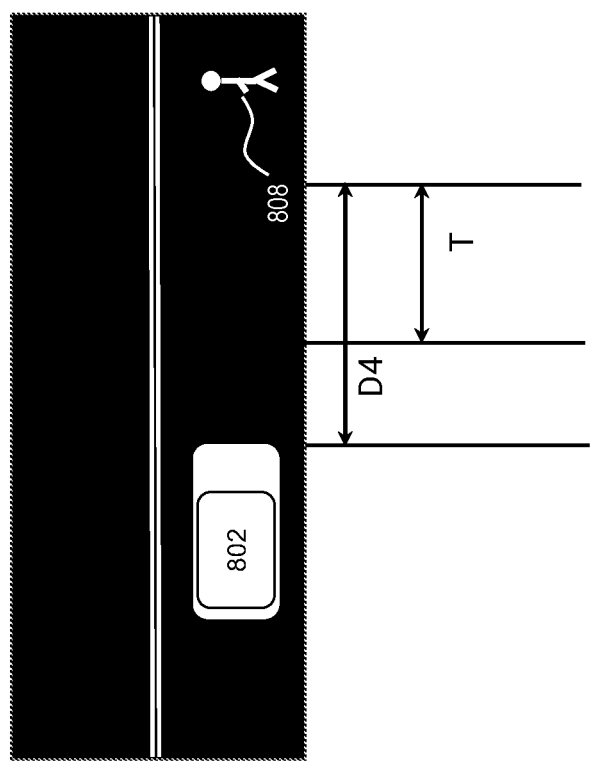

Referring now to FIGS. 8A-8C, as shown are example implementations of scenarios in which an autonomous vehicle can experience during operation by the system 500. FIG. 8A illustrates an implementation 800 of a cyclist encounter at a crosswalk by an autonomous vehicle 802. For example, the system 500 can obtain sensor data indicative of the environment include a road user, e.g., cyclist 804.

The system can be configured to obtain a rule indicative of a target expressive operation of the autonomous vehicle 802 in proximity of the road user. For example, the system 500 can be configured to slow down the autonomous vehicle 802 and stop well before the crosswalk. This can provide an expressive intent to the cyclist 804, indicating that it is safe to cross the crosswalk.

The rule can include a first criterion for initiation of the rule. The system 500 can determine that the first criterion is met in response to the sensor data being indicative that the autonomous vehicle is in a lane closest to a road boundary and that the autonomous vehicle 802 is in proximity of the cyclist 804 (e.g., road user). Other first criterion can be used as well, in conjunction with or instead of the listed first criterion.

As the first criterion is determined to be met in the implementation 800 shown in FIG. 8A, the system 500 applies the rule. Application of the rule can provide the expressive intent to the cyclist 804. Further, the system 500 can be configured to determine a violation metric based on the sensor data and a second criterion of the rule.

The second criterion may not be met in accordance with the sensor data being indicative of a stop distance parameter indicative of distance D2 being below a threshold T. In other words, the autonomous vehicle 802 stopped too closely to the cyclist 804. The system 500 can then determine a violation metric indicative of a violation distance parameter D1=T−D2. The violation distance parameter D1 includes a distance by which the stop distance parameter D2 does not satisfy the threshold T.

FIG. 8B illustrates an implementation 870 of a jaywalker encounter not at a crosswalk by an autonomous vehicle 802. As shown in FIG. 8B, a crosswalk is not required for the application of a rule. Accordingly, the implementation 870 in FIG. 8B is the same as with respect to FIG. 8A except that the road user is a jaywalker 806 instead of a cyclist, and the lack of a crosswalk.

Additionally, the system 500 can be configured to determine a violation metric based on the sensor data and a second criterion of the rule. The second criterion can be met in accordance with the sensor data being indicative of a stop distance parameter indicative of distance D3 being equal to a threshold T. In other words, the autonomous vehicle 802 properly stopped, thereby providing an expressive intent to the jaywalker 806. The system determines in this example a violation metric indicative of zero-violation.

FIG. 8C illustrates an implementation 850 of a traffic controller encounter by an autonomous vehicle 802. FIG. 8C illustrates a similar situation as FIG. 8B with the difference being that the road user is a traffic controller 808 on the road instead of a jaywalker. Similar to FIG. 8B, the vehicle properly stopped at a stop distance parameter D4 which is above the threshold, thereby providing an expressive intent to the traffic controller, and a violation metric indicative of zero violation.

Referring now to FIG. 9, illustrated is a flowchart of a method or process 900 for autonomous vehicle yielding, such as for operating and/or controlling an autonomous vehicle. The method can be performed by a system disclosed herein, such as an AV compute 400, and a vehicle 102, 200, of FIGS. 1, 2, 3, 4 and AV compute 540, system 500 of FIG. 5 and implementations of FIGS. 6-8C. The system disclosed can include at least one processor which can be configured to carry out one or more of the operations of method 900. The method 900 can be performed (e.g., completely, partially, and/or the like) by another device or group of devices separate from or including system disclosed herein.

In one or more example methods, the method 900 includes obtaining 902, using at least one processor, sensor data associated with an environment in which an autonomous vehicle operates according to a first trajectory of a plurality of trajectories, the environment comprising a road user at a location. In one or more example methods, the method 900 includes obtaining 904, using the at least one processor, a rule indicative of a target expressive operation of the autonomous vehicle in proximity of the road user, the rule comprising a first criterion for initiation of application of the rule, and a second criterion. In one or more example methods, the method 900 includes determining 906, using the at least one processor, whether the sensor data meets the first criterion. In one or more example methods, the method 900 includes, in response to the sensor data meeting the first criterion, applying 908 the rule. In one or more example methods, applying 908 the rule comprises determining, using the at least one processor, based on the sensor data and the second criterion, a violation metric. In one or more example methods, the method 900 includes evaluating 910, using the at least one processor, based on the violation metric, the first trajectory of the autonomous vehicle. In one or more example methods, the method 900 includes selecting 912, using the at least one processor, based on the violation metric, a second trajectory from the plurality of trajectories.

In one or more example methods, the method 900 includes, in response to the sensor data not meeting the first criterion, forgoing 907 applying the rule. The first criterion can be used to apply a rule when the first criterion is met, such as an entry criterion. The autonomous vehicle can be in proximity of the road user when the sensor data indicates presence of the road user. Proximity can be seen as within a sensing range of a sensor providing the sensor data. The rule can be seen as an expressive rule, such as an expressive yielding rule. The target expressive operation can include expressive stopping and/or expressive yielding.

In one or more examples, the second criterion is for detecting whether the rule is satisfied. The violation metric can be seen as a metric indicative of a violation or a non-violation of the rule. The violation metric can include parameter quantifying the violation. The second trajectory can be the same as the first trajectory. In some examples, the second trajectory can be different than the first trajectory.

In one or more example methods, the method 900 includes controlling, using the at least one processor, the autonomous vehicle based on the selected second trajectory. Controlling can include generating, based on the second trajectory and/or the violation metric, control data associated with control of the autonomous vehicle, and/or transmitting the control data to a controller of the autonomous vehicle and/or actually operating the autonomous vehicle.

In one or more example methods, determining, using the at least one processor, based on the sensor data and the second criterion, the violation metric includes determining, using the at least one processor, whether the sensor data meets the second criterion.

In one or more example methods, determining, using the at least one processor, whether the sensor data meets the second criterion includes determining, using the at least one processor, based on the sensor data, a stop distance parameter indicative of a distance between a location of the autonomous vehicle and the location of the road user when the autonomous vehicle reaches a stop, and determining, using the at least one processor, whether the stop distance parameter is below a threshold, wherein the sensor data does not meet the second criterion in response to the stop distance parameter being below a threshold. The threshold can be seen as an expressive threshold, such as an expressive yielding threshold.

In one or more example methods, determining, using the at least one processor, based on the sensor data and the second criterion, the violation metric includes, in response to the sensor data meeting the second criterion, determining the violation metric as indicative of zero violation.

In one or more example methods, determining, using the at least one processor, based on the sensor data and the second criterion, the violation metric includes, in response to the sensor data not meeting the second criterion, determining the violation metric as indicative of a violation distance parameter.

In one or more example methods, the violation distance parameter includes a distance by which the stop distance parameter does not satisfy the threshold. The distance can be a distance by which the autonomous vehicle has violated the rule, such as a difference between the threshold and the stop distance parameter.

In one or more example methods, the rule includes a third criterion to exit the rule. The method 900 can include determining whether the sensor data meets the third criterion. The method 900 can include in response to the sensor data meeting the third criterion, exiting the rule (such as ceasing to apply the rule). For example, the sensor data meets the third criterion when the sensor data stops indicating presence of the road user in vicinity of the autonomous vehicle.

In one or more example methods, the sensor data meets the first criterion, in response to the sensor data indicating that the autonomous vehicle is in proximity of the road user. For example, the autonomous vehicle approaches a crosswalk, a jaywalker, a cyclist, and/or a traffic controller. In other words, the first criterion can include a first condition that is met when the sensor data indicates that the autonomous vehicle is in proximity of the road user.

In one or more example methods, the sensor data meets the first criterion in response to the sensor data indicating that the autonomous vehicle is in a lane closest to a road boundary. For example, the right most lane closest to the road boundary or the left most lane closest to the road boundary. In other words, the first criterion can include a second condition that is met when the sensor data indicates that the autonomous vehicle is in a lane closest to a lane boundary, e.g. right most or left most. In one or more example methods, the sensor data meets the first criterion in response to the sensor data indicating that the road user is off a road surface. For example, a pedestrian is off the road surface. In other words, the first criterion can include a third condition that is met when the sensor data indicates that the road user is off the road surface. In one or more example methods, the sensor data meets the first criterion in response to the sensor data indicating that the road user is in a lane closest to a road boundary. For example, a pedestrian is in right most lane. In other words, the first criterion can include a fourth condition that is met when the sensor data indicates that the road user is in a lane closest to a road boundary. In one or more example methods, the sensor data meets the first criterion in response to the sensor data indicating that a distance between the location the road user and a location of a crosswalk does not meet a distance threshold. For example, a pedestrian is in the right most lane. In other words, the first criterion can include a fifth condition that is met when the sensor data indicates that a distance between the location the road user and a location of a crosswalk is below a distance threshold. For example, the pedestrian can be located within a certain distance threshold from the location of a crosswalk.

In one or more example methods, the location of the road user includes an area surrounding the location of the road user. In one or more example methods, the area surrounding the location of the road user comprises a zone for communicating intent of a maneuver of the autonomous vehicle. For example, an expressive autonomous vehicle which can be seen as an expressive robot, e.g., a zone of expressive robot.

In one or more example methods, the method 900 includes determining, using the at least one processor, a total violation metric for all locations to which the rule is applied. For example, the total violation metric can be based on the square root of the sum of violations for all crosswalks to which the rule is applied.

In one or more example methods, the method 900 includes providing, using the at least one processor, data indicative of the total violation metric, for control of the autonomous vehicle. Providing can include transmitting and/or generating the data indicative of the total violation metric.

In one or more example methods, the method 900 includes selecting, using the at least one processor, based on the total violation metric, the second trajectory from the plurality of trajectories.

In one or more example methods, the road user can be one or more of: a user-operated vehicle and a pedestrian. The road user can be a user-operated vehicle which includes a cyclist and/or a user-operated scooter. For example, the road user can be one or more of: a user-operated vehicle and a pedestrian near a crosswalk.

In one or more example methods, determining 906 whether the sensor data meets the first criterion includes determining that the sensor data meets the first criterion in accordance with the sensor data being indicative of the location of the road user being in the vicinity of a crosswalk.

In one or more example methods, the target expressive operation of the autonomous vehicle in proximity of the road user includes yielding at a crosswalk.

In one or more example methods, evaluating 910, using the at least one processor, based on the violation metric, the first trajectory of the autonomous vehicle is performed after completion of the first trajectory.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Disclosed are non-transitory computer readable media comprising instructions stored thereon that, when executed by at least one processor, cause the at least one processor to carry out operations according to one or more of the methods disclosed herein.

Also disclosed are methods, non-transitory computer readable media, and systems according to any of the following items:

Item 1. A method comprising:
obtaining, using at least one processor, sensor data associated with an environment in which an autonomous vehicle operates according to a first trajectory of a plurality of trajectories, the environment comprising a road user at a location;
obtaining, using the at least one processor, a rule indicative of a target expressive operation of the autonomous vehicle in proximity of the road user, the rule comprising a first criterion for initiation of application of the rule, and a second criterion; determining, using the at least one processor, whether the sensor data meets the first criterion,
in response to the sensor data meeting the first criterion, applying the rule; wherein applying the rule comprises determining, using the at least one processor, based on the sensor data and the second criterion, a violation metric;
evaluating, using the at least one processor, based on the violation metric, the first trajectory of the autonomous vehicle; and
selecting, using the at least one processor, based on the violation metric, a second trajectory from the plurality of trajectories.

Item 2. The method of item 1, the method comprising controlling, using the at least one processor, the autonomous vehicle based on the selected second trajectory.

Item 3. The method of item 1, wherein determining, using the at least one processor, based on the sensor data and the second criterion, the violation metric comprises:
determining, using the at least one processor, whether the sensor data meets the second criterion.

Item 4. The method of item 3, wherein determining, using the at least one processor, whether the sensor data meets the second criterion comprises:
determining, using the at least one processor, based on the sensor data, a stop distance parameter indicative of a distance between a location of the autonomous vehicle and the location of the road user when the autonomous vehicle reaches a stop; and
determining, using the at least one processor, whether the stop distance parameter is below a threshold;
wherein the sensor data does not meet the second criterion in response to the stop distance parameter being below a threshold.

Item 5. The method of any of items 3-4, wherein determining, using the at least one processor, based on the sensor data and the second criterion, the violation metric comprises:
in response to the sensor data meeting the second criterion, determining the violation metric as indicative of zero violation.

Item 6. The method of any of items 3-5, wherein determining, using the at least one processor, based on the sensor data and the second criterion, the violation metric comprises:
in response to the sensor data not meeting the second criterion, determining the violation metric as indicative of a violation distance parameter.

Item 7. The method of item 6, wherein the violation distance parameter includes a distance by which the stop distance parameter does not satisfy the threshold.

Item 8. The method of any of the previous items, wherein the rule includes a third criterion to exit the rule.

Item 9. The method of any of the previous items, wherein the sensor data meets the first criterion, in response to the sensor data indicating that the autonomous vehicle is in proximity of the road user and/or of the location.

Item 10. The method of any of the previous items, wherein the sensor data meets the first criterion in response to the sensor data indicating that the autonomous vehicle is in a lane closest to a road boundary.

Item 11. The method of any of the previous items, wherein the sensor data meets the first criterion in response to the sensor data indicating that the road user is off a road surface.

Item 12. The method of any of the previous items, wherein the sensor data meets the first criterion in response to the sensor data indicating that the road user is in a lane closest to a road boundary.

Item 13. The method of any of the previous items, wherein the sensor data meets the first criterion in response to the sensor data indicating that a distance between the location the road user and a location of a crosswalk does not meet a distance threshold.

Item 14. The method of any of the previous items, wherein the location of the road user includes an area surrounding the location of the road user.

Item 15. The method of item 14, wherein the area surrounding the location of the road user comprises a zone for communicating intent of a maneuver of the autonomous vehicle.

Item 16. The method of any of the previous items, the method comprising:
determining, using the at least one processor, a total violation metric for all locations to which the rule applied.

Item 17. The method of item 16, the method comprising providing, using the at least one processor, data indicative of the total violation metric, for control of the autonomous vehicle.

Item 18. The method of any of items 16-17, the method comprising selecting, using the at least one processor, based on the total violation metric, the second trajectory from the plurality of trajectories.

Item 19. The method of any of the previous items, wherein the road user can be one or more of: a user-operated vehicle and a pedestrian.

Item 20. The method of any of the previous items, wherein determining whether the sensor data meets the first criterion comprises determining that the sensor data meets the first criterion in accordance with the sensor data being indicative of the location of the road user being in the vicinity of a crosswalk.

Item 21. The method of any of the previous items, wherein the target expressive operation of the autonomous vehicle in proximity of the road user comprises yielding at a crosswalk.

Item 22. The method of any of the previous items, wherein evaluating, using the at least one processor, based on the violation metric, the first trajectory of the autonomous vehicle is performed after completion of the first trajectory.

Item 23. A system comprising:
at least one processor; and
at least one non-transitory computer readable medium storing instructions that, when executed by the at least one processor, cause the at least one processor to perform operations comprising:
  obtain, using at least one processor, sensor data associated with an environment in which an autonomous vehicle operates according to a first trajectory of a plurality of trajectories, the environment comprising a road user at a location;
  obtain, using the at least one processor, a rule indicative of a target expressive operation of the autonomous vehicle in proximity of the road user, the rule comprising a first criterion for initiation of application of the rule, and a second criterion;
  determine, using the at least one processor, whether the sensor data meets the first criterion,
  in response to the sensor data meeting the first criterion, apply the rule; wherein to apply the rule comprises to determine, using the at least one processor, based on the sensor data and the second criterion, a violation;
  evaluate, using the at least one processor, based on the violation metric, the first trajectory of the autonomous vehicle; and
  select, using the at least one processor, based on the violation metric, a second trajectory from the plurality of trajectories.

Item 24. The system of item 23, wherein the at least one non-transitory computer readable medium stores instructions that, when executed by the at least one processor, cause the at least one processor to perform operations comprising:
  control, using the at least one processor, the autonomous vehicle based on the selected second trajectory.

Item 25. The system of item 23, wherein to determine, using the at least one processor, based on the sensor data and the second criterion, the violation metric comprises to:
  determine, using the at least one processor, whether the sensor data meets the second criterion.

Item 26. The system of item 25, wherein to determine, using the at least one processor, whether the sensor data meets the second criterion comprises to:
  determine, using the at least one processor, based on the sensor data, a stop distance parameter indicative of a distance between a location of the autonomous vehicle and the location of the road user when the autonomous vehicle reaches a stop; and
  determine, using the at least one processor, whether the stop distance parameter is below a threshold;
wherein the sensor data does not meet the second criterion in response to the stop distance parameter being below a threshold.

Item 27. The system of any of items 25-26, wherein to determine, using the at least one processor, based on the sensor data and the second criterion, the violation metric comprises to:
  in response to the sensor data meeting the second criterion, determine the violation metric as indicative of zero violation.

Item 28. The system of any of items 25-27, wherein to determine, using the at least one processor, based on the sensor data and the second criterion, the violation metric comprises to:
  in response to the sensor data not meeting the second criterion, determine the violation metric as indicative of a violation distance parameter.

Item 29. The system of item 28, wherein the violation distance parameter includes a distance by which the stop distance parameter does not satisfy the threshold.

Item 30. The system of any of items 23-29, wherein the rule includes a third criterion to exit the rule.

Item 31. The system of any of items 23-30, wherein the sensor data meets the first criterion, in response to the sensor data indicating that the autonomous vehicle is in proximity of the road user and/or of the location.

Item 32. The system of any of items 23-31, wherein the sensor data meets the first criterion in response to the sensor data indicating that the autonomous vehicle is in a lane closest to a road boundary.

Item 33. The system of any of items 23-32, wherein the sensor data meets the first criterion in response to the sensor data indicating that the road user is off a road surface.

Item 34. The system of any of items 23-33, wherein the sensor data meets the first criterion in response to the sensor data indicating that the road user is in a lane closest to a road boundary.

Item 35. The system of any of items 23-34, wherein the sensor data meets the first criterion in response to the sensor data indicating that a distance between the location the road user and a location of a crosswalk does not meet a distance threshold.

Item 36. The system of any of items 23-35, wherein the location of the road user includes an area surrounding the location of the road user.

Item 37. The system of item 36, wherein the area surrounding the location of the road user comprises a zone for communicating intent of a maneuver of the autonomous vehicle.

Item 38. The system of any of items 23-37, wherein the at least one non-transitory computer readable medium stores instructions that, when executed by the at least one processor, cause the at least one processor to perform operations comprising: determine, using the at least one processor, a total violation metric for all locations to which the rule applied.

Item 39. The system of item 38, wherein the at least one non-transitory computer readable medium stores instructions that, when executed by the at least one processor, cause the at least one processor to perform operations comprising:
  provide, using the at least one processor, data indicative of the total violation metric, for control of the autonomous vehicle.

Item 40. The system of any of items 38-39, wherein the at least one non-transitory computer readable medium stores instructions that, when executed by the at least one processor, cause the at least one processor to perform operations comprising:
  select, using the at least one processor, based on the total violation metric, the second trajectory from the plurality of trajectories.

Item 41. The system of any of items 23-40, wherein the road user can be one or more of: a user-operated vehicle and a pedestrian.

Item 42. The system of any of items 23-41, wherein to determine whether the sensor data meets the first criterion comprises determine that the sensor data meets the first criterion in accordance with the sensor data being indicative of the location of the road user being in the vicinity of a crosswalk.

Item 43. The system of any of items 23-42, wherein the target expressive operation of the autonomous vehicle in proximity of the road user comprises yielding at a crosswalk.

Item 44. The system of any of items 23-43, wherein to evaluate, using the at least one processor, based on the violation metric, the first trajectory of the autonomous vehicle is performed after completion of the first trajectory.

Item 45. A non-transitory computer readable medium comprising instructions stores thereon that, when executed by at least one processor, cause the at least one processor to carry out operations comprising:
- obtaining, using at least one processor, sensor data associated with an environment in which an autonomous vehicle operates according to a first trajectory of a plurality of trajectories, the environment comprising a road user at a location;
- obtaining, using the at least one processor, a rule indicative of a target expressive operation of the autonomous vehicle in proximity of the road user, the rule comprising a first criterion for initiation of application of the rule, and a second criterion;
- determining, using the at least one processor, whether the sensor data meets the first criterion,
- in response to the sensor data meeting the first criterion, applying the rule; wherein applying the rule comprises determining, using the at least one processor, based on the sensor data and the second criterion, a violation metric;
- evaluating, using the at least one processor, based on the violation metric, the first trajectory of the autonomous vehicle; and
- selecting, using the at least one processor, based on the violation metric, a second trajectory from the plurality of trajectories.

Item 46. The non-transitory computer readable medium of item 45, wherein the instructions, when executed by at least one processor, cause the at least one processor to carry out operations comprising:
- using the at least one processor, the autonomous vehicle based on the selected second trajectory.

Item 47. The non-transitory computer readable medium of item 45, wherein determining, using the at least one processor, based the sensor data and the second criterion, the violation metric comprises:
- determining, using the at least one processor, whether the sensor data meets the second criterion.

Item 48. The non-transitory computer readable medium of item 47, wherein determining, using the at least one processor, whether the sensor data meets the second criterion comprises:
- determining, using the at least one processor, based on the sensor data, a stop distance parameter indicative of a distance between a location of the autonomous vehicle and the location of the road user when the autonomous vehicle reaches a stop; and
- determining, using the at least one processor, whether the stop distance parameter is below a threshold;
wherein the sensor data does not meet the second criterion in response to the stop distance parameter being below a threshold.

Item 49. The non-transitory computer readable medium of any of items 47-48, wherein determining, using the at least one processor, based on the sensor data and the second criterion, the violation metric comprises:
- in response to the sensor data meeting the second criterion, determining the violation metric as indicative of zero violation.

Item 50. The non-transitory computer readable medium of any of items 47-49, wherein determining, using the at least one processor, based on the sensor data and the second criterion, the violation metric comprises:
- in response to the sensor data not meeting the second criterion, determining the violation metric as indicative of a violation distance parameter.

Item 51. The non-transitory computer readable medium of item 50, wherein the violation distance parameter includes a distance by which the stop distance parameter does not satisfy the threshold.

Item 52. The non-transitory computer readable medium of any of items 45-51, wherein the rule includes a third criterion to exit the rule.

Item 53. The non-transitory computer readable medium of any of items 45-52, wherein the sensor data meets the first criterion, in response to the sensor data indicating that the autonomous vehicle is in proximity of the road user.

Item 54. The non-transitory computer readable medium of any of items 45-53, wherein the sensor data meets the first criterion in response to the sensor data indicating that the autonomous vehicle is in a lane closest to a road boundary Item 55. The non-transitory computer readable medium of any of items 45-54, wherein the sensor data meets the first criterion in response to the sensor data indicating that the road user is off a road surface.

Item 56. The non-transitory computer readable medium of any of items 45-55, wherein the sensor data meets the first criterion in response to the sensor data indicating that the road user is in a lane closest to a road boundary.

Item 57. The non-transitory computer readable medium of any of items 45-56, wherein the sensor data meets the first criterion in response to the sensor data indicating that a distance between the location the road user and a location of a crosswalk does not meet a distance threshold.

Item 58. The non-transitory computer readable medium of any of items 45-57, wherein the location of the road user includes an area surrounding the location of the road user.

Item 59. The non-transitory computer readable medium of item 58, wherein the area surrounding the location of the road user comprises a zone for communicating intent of a maneuver of the autonomous vehicle.

Item 60. The non-transitory computer readable medium of any of items 45-59, wherein the instructions, when executed by at least one processor, cause the at least one processor to carry out operations comprising:
- determining, using the at least one processor, a total violation metric for all locations to which the rule applied.

Item 61. The non-transitory computer readable medium of item 60, wherein the instructions, when executed by at least one processor, cause the at least one processor to carry out operations comprising:
- providing, using the at least one processor, data indicative of the total violation metric, for control of the autonomous vehicle.

Item 62. The non-transitory computer readable medium of any of items 60-61, wherein the instructions, when executed by at least one processor, cause the at least one processor to carry out operations comprising:
- selecting, using the at least one processor, based on the total violation metric, the second trajectory from the plurality of trajectories.

Item 63. The non-transitory computer readable medium of any of items 45-62, wherein the road user can be one or more of: a user-operated vehicle and a pedestrian.

Item 64. The non-transitory computer readable medium of any of items 45-63, wherein determining whether the sensor data meets the first criterion comprises determining that the sensor data meets the first criterion in accordance with the sensor data being indicative of the location of the road user being in the vicinity of a crosswalk.

Item 65. The non-transitory computer readable medium of any of items 45-64, wherein the target expressive operation of the autonomous vehicle in proximity of the road user comprises yielding at a crosswalk.

Item 66. The non-transitory computer readable medium of any of items 45-65, wherein evaluating, using the at least one processor, based on the violation metric, the first trajectory of the autonomous vehicle is performed after completion of the first trajectory.

What is claimed is:

1. A method for indicated that an autonomous vehicle is yielding to a road user, the method comprising:
    obtaining, using at least one processor, first sensor data associated with an environment of an autonomous vehicle;
    generating, using the at least one processor, a plurality of trajectories based at least in part on the first sensor data;
    selecting, using the at least one processor, a first trajectory from the plurality of trajectories;
    causing navigation of the autonomous vehicle according to the first trajectory;
    while operating the autonomous vehicle in an autonomous mode according to the first trajectory:
        obtaining, using at least one processor, second sensor data associated with the environment;
        identifying, using the second sensor data, a road user at a location within the environment;
        determining, using the second sensor data, a type of the road user from a plurality of types of road users, wherein the type of road user is one of a pedestrian or cyclist;
        based on the type of the road user, obtaining, using the at least one processor, a rule from a plurality of rules, wherein the rule corresponds to a target expressive operation for the autonomous vehicle in relation to the road user, the rule comprising a first criterion for initiation of application of the rule, and a second criterion for selecting an alternate trajectory from the plurality of trajectories;
        determining, using the at least one processor, that the second sensor data satisfies the first criterion; and
        in response to determining that the second sensor data satisfies the first criterion, applying the rule, wherein applying the rule comprises:
            determining, using the at least one processor, that the first trajectory does not satisfy the second criterion based on a determination that the first trajectory is not configured to stop the autonomous vehicle a threshold distance before a safety margin of a crosswalk to indicate to the road user that the autonomous vehicle is yielding to the road user, wherein the safety margin of the crosswalk is located outside the crosswalk, and
            selecting, using the at least one processor a second trajectory from the plurality of trajectories; and
    causing navigation of the autonomous vehicle according to the second trajectory.

2. The method of claim 1, wherein the rule includes a third criterion to exit the rule.

3. The method of claim 1, wherein determining the first sensor data satisfies the first criterion comprises determining that the first sensor data indicates that the autonomous vehicle is in proximity of the road user.

4. The method of claim 1, wherein determining the first sensor data satisfies the first criterion comprises determining the first sensor data indicates that the autonomous vehicle is in a lane closest to a road boundary.

5. The method of claim 1, wherein determining the first sensor data satisfies the first criterion comprises determining the first sensor data indicates that the road user is off a road surface.

6. The method of claim 1, wherein determining the first sensor data satisfies the first criterion comprises determining the first sensor data indicates that the road user is in a lane closest to a road boundary.

7. The method of claim 1, wherein the threshold distance before a safety margin of a crosswalk is a first threshold distance, wherein determining the first sensor data satisfies the first criterion comprises determining the first sensor data indicates that a distance between the location of the road user and a location of a crosswalk does not meet a second threshold distance.

8. The method of claim 1, wherein the location of the road user includes an area surrounding the road user.

9. The method of claim 8, wherein the area surrounding the location of the road user comprises a zone for communicating intent of a maneuver of the autonomous vehicle.

10. The method of claim 1, wherein determining, using the at least one processor, that the first trajectory does not satisfy the threshold distance comprises:
    determining, using the at least one processor, that the second sensor data does not satisfy the second criterion only when the first criterion has previously been determined to be satisfied.

11. The method of claim 10, wherein determining, using the at least one processor, that the first trajectory does not satisfy the threshold distance further comprises:
    in response to determining, using the at least one processor, that the second sensor data does not satisfy the second criterion, determining that the second sensor data does not satisfy a third criterion only when the first criterion has previously been determined to be satisfied.

12. The method of claim 1, wherein applying the rule comprises:
    determining, using the at least one processor, a weight parameter for the threshold distance; and
    determining, using the threshold distance and the weight parameter, an expected position and velocity of the autonomous vehicle according to the first trajectory.

13. The method of claim 1, wherein determining the first sensor data satisfies the first criterion comprises determining that the first sensor data indicates that the autonomous vehicle is a closest vehicle to the crosswalk.

14. The method of claim 1, wherein the threshold distance before the safety margin of the crosswalk is at least five meters.

15. The method of claim 1, wherein the safety margin of the crosswalk is at least two meters.

16. A system for indicating that an autonomous vehicle is yielding to a road user, the system comprising:
    an autonomous vehicle in an autonomous mode;
    at least one processor; and
    at least one non-transitory computer readable medium storing instructions that, when executed by the at least one processor, cause the at least one processor to perform operations comprising:
        obtain first sensor data associated with an environment of the autonomous vehicle;
        generate a plurality of trajectories based at least in part on the first sensor data;

select a first trajectory from the plurality of trajectories;
cause navigation of the autonomous vehicle according to the first trajectory;
while operating the autonomous vehicle in an autonomous mode according to the first trajectory:
  obtain second sensor data associated with the environment;
  identify, using the second sensor data, a road user at a location within the environment;
  determine, using the second sensor data, a type of the road user from a plurality of types of road users, wherein the type of road user is one of a pedestrian or cyclist;
  based on the type of the road user, obtain a rule from a plurality of rules, wherein the rule corresponds to a target expressive operation for the autonomous vehicle in relation to the road user, the rule comprising a first criterion for initiation of application of the rule, and a second criterion for selecting an alternate trajectory from the plurality of trajectories;
  determine that the second sensor data satisfies the first criterion;
  in response to determining that the second sensor data satisfies the first criterion, apply the rule wherein to apply the rule comprises:
    determine that the first trajectory does not satisfy the second criterion based on a determination that the first trajectory is not configured to stop the autonomous vehicle a threshold distance before a safety margin of a crosswalk to indicate to the road user that the autonomous vehicle is yielding to the road user, wherein the safety margin of the crosswalk is located outside the crosswalk, and
    select, using the at least one processor, a second trajectory from the plurality of trajectories; and
  cause navigation of the autonomous vehicle according to the second trajectory.

17. A non-transitory computer readable medium comprising instructions stores thereon that, when executed by at least one processor, cause the at least one processor to carry out operations for indicated than an autonomous vehicle is yielding to a road user, the operations comprising:
obtaining first sensor data associated with an environment of an autonomous vehicle;
generating a plurality of trajectories based at least in part on the first sensor data;
selecting a first trajectory from the plurality of trajectories;
causing navigation of the autonomous vehicle according to the first trajectory;
while operating the autonomous vehicle in an autonomous mode according to the first trajectory:
obtaining second sensor data associated with the environment;
identifying a road user at a location within the environment;
determining a type of the road user from a plurality of types of road users, wherein the type of road user is one of a pedestrian or cyclist;
based on the type of the road user, obtaining a rule from a plurality of rules, wherein the rule corresponds to a target expressive operation of the autonomous vehicle in relation to the road user, the rule comprising a first criterion for initiation of application of the rule, and a second criterion for selecting an alternate trajectory from the plurality of trajectories;
determining that the second sensor data satisfies the first criterion;
in response to determining the second sensor data satisfies the first criterion, applying the rule, wherein applying the rule comprises:
  determining that the first trajectory does not satisfy the second criterion based on a determination that the first trajectory is not configured to stop the autonomous vehicle a threshold distance before a safety margin of a crosswalk to indicate to the road user that the autonomous vehicle is yielding to the road user, wherein the safety margin of the crosswalk is located outside of the crosswalk, and
  selecting a second trajectory from the plurality of trajectories; and
causing navigation of the autonomous vehicle according to the second trajectory.

* * * * *

UNITED STATES PATENT AND TRADEMARK OFFICE
CERTIFICATE OF CORRECTION

| | | |
|---|---|---|
| PATENT NO. | : 12,479,471 B2 | Page 1 of 1 |
| APPLICATION NO. | : 17/839520 | |
| DATED | : November 25, 2025 | |
| INVENTOR(S) | : Noushin Mehdipour et al. | |

It is certified that error appears in the above-identified patent and that said Letters Patent is hereby corrected as shown below:

In the Specification

Column 8, Line no. 32, delete "predetermined spectrum In" and insert -- predetermined spectrum. In --.

Column 29, Line 22 (approx.), delete "scope C indicates " and insert -- scope indicates --.

Column 30, Line 22 (approx.), delete "includes lane lane" and insert -- includes lane --.

Column 30, Line 37 (approx.) , delete "in lane lane at" and insert -- in lane at --.

Column 40, Line 20, delete "road boundary" and insert -- road boundary. --.

In the Claims

Column 42, Claim 13, Line 50, delete "is a closest " and insert -- is the closest --.

Column 43, Claim 16, Line 36, delete "select, using the at least one processor, a" and insert -- select a --.

Signed and Sealed this
Twentieth Day of January, 2026

John A. Squires
*Director of the United States Patent and Trademark Office*